United States Patent
O'Flaherty et al.

(10) Patent No.: US 9,988,055 B1
(45) Date of Patent: Jun. 5, 2018

(54) VEHICLE OCCUPANT MONITORING USING INFRARED IMAGING

(71) Applicant: STATE FARM MUTUAL AUTOMOBILE INSURANCE COMPANY, Bloomington, IL (US)

(72) Inventors: Seth O'Flaherty, Ames, IA (US); Sean Mahaffey, White Heath, IL (US); Ayush Kumar, Edwards, IL (US); Jacob Schroeder, Towanda, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days. days.

(21) Appl. No.: 15/248,073

(22) Filed: Aug. 26, 2016

Related U.S. Application Data

(60) Provisional application No. 62/213,256, filed on Sep. 2, 2015.

(51) Int. Cl.
| | |
|---|---|
| *G08B 23/00* | (2006.01) |
| *B60W 40/08* | (2012.01) |
| *G08B 21/02* | (2006.01) |
| *H04W 24/00* | (2009.01) |
| *H04W 4/22* | (2009.01) |

(52) U.S. Cl.
CPC ............ *B60W 40/08* (2013.01); *G08B 21/02* (2013.01); *B60W 2040/0872* (2013.01); *B60W 2420/403* (2013.01); *H04W 4/22* (2013.01)

(58) Field of Classification Search
CPC ......... B60W 40/08; B60W 2040/0872; B60W 2420/403; G08B 21/02; H04W 4/22

USPC .......................................................... 340/576
See application file for complete search history.

(56) References Cited

U.S. PATENT DOCUMENTS

| | | | | |
|---|---|---|---|---|
| 2007/0260375 A1* | 11/2007 | Hilton | ................ | G01M 17/007 701/33.4 |
| 2010/0317367 A1* | 12/2010 | Tamura | ................ | H04W 48/20 455/456.1 |
| 2014/0172467 A1* | 6/2014 | He | ........................ | B60K 28/066 705/4 |
| 2016/0117947 A1* | 4/2016 | Misu | ........................ | G09B 9/04 434/62 |

(Continued)

*Primary Examiner* — Jack K Wang
(74) *Attorney, Agent, or Firm* — Marshall, Gerstein & Borun LLP; Randall G. Rueth

(57) ABSTRACT

Methods and systems for monitoring vehicle occupants using infrared and other sensors are disclosed. The systems may use infrared sensor data to identify each vehicle occupant using biometric signatures (such as heartbeat or facial recognition). Vehicle occupant characteristics may be determined that include skeletal characteristics of the occupants. Further monitoring of the occupants using sensor data may occur until an abnormal situation is detected. Abnormal situations may include medical emergencies, driver impairment, security threats, or similar situations requiring correcting action. The system may then determine and implement an appropriate response to the abnormal situation. Such responses may include generating alerts, adjusting vehicle environmental controls, taking control of operation of the vehicle (such as an autonomous or semi-autonomous vehicle), or initiating wireless communication with an outside party, such as an emergency service.

18 Claims, 14 Drawing Sheets

(56) References Cited

U.S. PATENT DOCUMENTS

2017/0076396 A1\* 3/2017 Sudak ................... G06Q 40/08
2017/0174129 A1\* 6/2017 Chin ........................ B60R 1/00

\* cited by examiner

VEHICLE OCCUPANT MONITORING USING INFRARED IMAGING

CROSS-REFERENCE TO RELATED APPLICATIONS

This application claims the benefit of U.S. Provisional Application No. 62/213,256, filed Sep. 2, 2015, the entirety of which is hereby incorporated herein by reference.

FIELD

The present disclosure generally relates to systems and methods addressed to vehicle occupant safety and health monitoring and response using infrared sensors to identify and assess occupant characteristics or conditions.

BACKGROUND

Every year many vehicle accidents are caused by vehicle operators impaired by drowsiness, illness, intoxication, rage, or distraction. One common kind of impaired vehicle operation is drowsy driving. If the vehicle operator falls asleep for even a second while driving, the results can be disastrous. Another common kind of impaired vehicle operation is distracted driving. Modern motor vehicles come equipped with any number of distractions including stereos, air-conditioners, navigation systems, etc. Furthermore, a vehicle operator may be distracted by another passenger or by articles the vehicle operator brings into the vehicle (e.g., a mobile telephone, book, etc.). Yet another common kind of impaired vehicle operation is agitated, anxious, or aggressive driving. Numerous incidents occurring during the course of a trip may aggravate the vehicle operator, such as traffic jams, poor driving by other drivers, vehicle malfunctions, or inclement weather conditions. Additionally, factors unrelated to the trip may distract or aggravate the vehicle operator, such as receipt of bad news, running behind schedule, passenger conduct, or any number of factors occurring prior to vehicle operation. These and other factors may impair the ability of vehicle operators to operate vehicles safely.

Many modern vehicles are equipped with on-board computer systems that control some or all of the operational, environmental, and informational features of the vehicles. Additionally, many vehicle operators carry mobile devices (such as smartphones) with them while operating vehicles. Such mobile devices often communicate with the vehicle in ways that may allow the mobile devices to control portions of the vehicle features, such as external telephonic communication. Despite the availability of computing resources within many modern vehicles, such resources are not used to detect and mitigate dangerous situations involving vehicle operators or passengers. The methods and systems disclosed herein are addressed to such detection and mitigation.

BRIEF SUMMARY

The present invention discloses a method, system, and computer-readable medium storing instructions for determining and responding to abnormal or dangerous situations within a vehicle. The method, system, or computer-readable medium may operate to monitor and respond to abnormal situations based upon sensor data received using one or more processors. The one or more processors may be disposed within an on-board computer or a mobile device associated with the vehicle or with a vehicle occupant.

In accordance with the described embodiments, one or more processors may monitor one or more vehicle occupants of a vehicle by receiving sensor data regarding the one or more vehicle occupants from one or more sensors disposed within the vehicle, determining one or more vehicle occupant characteristics for at least one of the one or more vehicle occupants based upon the received sensor data, determining whether an abnormal situation exists based upon the one or more determined vehicle occupant characteristics, determining one or more responses to the abnormal situation based upon the one or more determined vehicle occupant characteristics when an abnormal situation is determined to exist, and/or causing the one or more responses to the abnormal situation to be implemented.

In some embodiments, the abnormal situation may relate to one or more of the following types of abnormal situations: a medical emergency, a health risk, an accident risk, an impairment of a vehicle occupant, and/or a security threat. Moreover, the one or more responses may be based upon the determined type of the abnormal situation. In some embodiments, the at least one vehicle occupant may include a vehicle operator controlling the vehicle. The determination of an abnormal situation and/or the one or more responses may be based, at least in part, upon whether the determined vehicle occupant characteristics are associated with a vehicle operator or are associated with another vehicle occupant, such as a passenger.

In further embodiments, the one or more processors may identify the at least one of the one or more vehicle occupants based upon the one or more determined vehicle occupant characteristics. This may include identifying the at least one of the one or more vehicle occupants includes comparing the one or more determined vehicle occupant characteristics with data regarding characteristics stored in a user profile. When a user profile is used, determining whether the abnormal situation exists may include determining whether the one or more determined vehicle occupant characteristics are beyond a baseline range for the vehicle occupant based upon the data regarding the characteristics stored in the user profile of the vehicle occupant.

In yet further embodiments, the one or more sensors may include one or more infrared sensors disposed within the vehicle. Using the sensor data (which may include infrared and/or optical image data), the one or more processors may determine vehicle occupant characteristics, which may include one or more skeletal characteristics of the at least one of the one or more vehicle occupants. Such skeletal characteristics may indicate the position of a plurality of segments of the vehicle occupant's body, which plurality of segments may include the vehicle occupant's head, torso, and/or at least a portion of a limb of the vehicle occupant.

In still further embodiments, the one or more responses may include one or more of the following: controlling vehicle operation by an on-board computer system, adjusting an environmental condition within the vehicle, communicating a message to an emergency response service, and/or terminating vehicle operation. Further responses may include communicating sensor data to one or more computing devices associated with emergency response personnel. Such communications may facilitate theft recovery, medical care delivery, and/or security threat response.

The methods, systems, and computer-readable media may include additional, fewer, or alternate actions, including those discussed elsewhere herein.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

The systems and methods described herein may be used to monitor and respond to abnormal or emergency situations that may occur within a vehicle or during operation of a vehicle. Although such situations may be described as "abnormal" or "emergency," no implication of unusual or uncommon occurrences is intended. Instead, such terms are used to distinguish situations requiring a corrective response from situations occurring in the ordinary operation of the vehicle under ordinary conditions following proper usage procedures. To detect and respond to abnormal or emergency situations, the systems and methods described herein may collect sensor data regarding vehicle occupants, determine characteristics of the vehicle occupants (e.g., heart rate, pulse strength, posture, temperature, etc.), compare the characteristics against expected values, and determine whether the determined characteristics indicate an abnormal situation. If an abnormal situation is determined to exist based upon the characteristics, the systems and methods may determine and implement an appropriate response (e.g., taking control of the vehicle, providing a notification to the vehicle operator, initiating emergency communications, etc.).

Exemplary Vehicle Occupant Monitoring System

Figure 1:
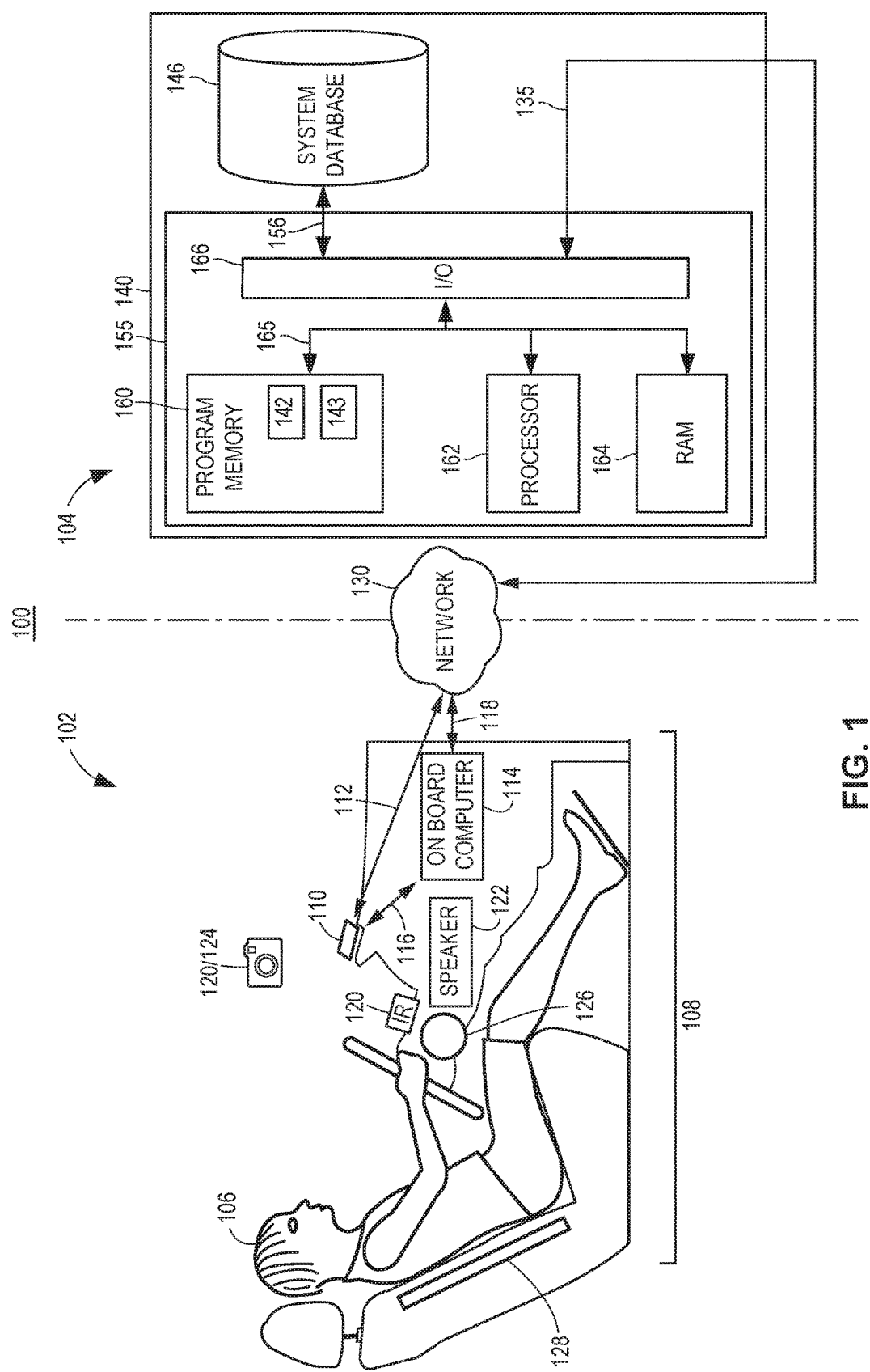
FIG. 1 illustrates a block diagram of an exemplary vehicle occupant monitoring system on which exemplary vehicle monitoring methods may operate in accordance with the described embodiments.

FIG. 1 illustrates a block diagram of an exemplary vehicle occupant monitoring system 100. The high-level architecture includes both hardware and software applications, as well as various data communications channels for communicating data between the various hardware and software components. The vehicle occupant monitoring system 100 may be roughly divided into front-end components 102 and back-end components 104. The front-end components 102 monitor vehicle occupants, including a vehicle operator 106, for indications of abnormal situations using data from a variety of sensors within a vehicle 108 (e.g., a car, truck, etc.). The sensors may include one or more infrared (IR) sensors 120, cameras 124, microphones 126, pressure sensors (not shown), or other similar sensor devices disposed within the vehicle 108 (collectively, the "sensors"). In some embodiments, part or all of the sensors may be disposed within a mobile computing device 110, such as a smartphone. The sensors may be removably or permanently installed within the vehicle 108 and may communicate with the mobile device 110 or an on-board computer 114.

The front-end components 102 may further process the sensor data collected from the one or more sensors using the mobile device 110 or on-board computer 114. When an abnormal or emergency situation is determined to exist, one or more appropriate responses to the situation may be determined using the mobile device 110 or on-board computer 114. Such responses may include alerting the vehicle operator 106, presenting mitigating stimuli (e.g., music, massages, etc.), controlling vehicle operation, initiating communication (e.g., telephone or text transmissions to emergency services), or taking other actions to address the abnormal or emergency situation.

In some embodiments of the system, the front-end components 102 may communicate with the back-end components 104 via a network 130. The back-end components 104 may use one or more servers 140 to process the sensor data provided by the front-end components 102, to store user profiles created based upon sensor data, to determine and/or implement responses to abnormal or emergency situations, or to perform other functions of the system, as described herein. In some embodiments, the front-end components 102 may form a stand-alone system that does not include the back-end components 104. Alternatively, in other embodiments, the front-end components 102 may be implemented as a thin-client system, with substantially all processing and data storage performed by the server 140 using sensor data transmitted through the network 130.

The front-end components 102 may be disposed within, or communicatively connected to, one or more mobile devices 110 or on-board computers 114, which may be permanently or removably installed in the vehicle 108. The mobile device 110 or the on-board computer 114 may interface with one or more sensors within the vehicle 108, which sensors may also be incorporated within or connected to the mobile device 110 or the on-board computer 114. The one or more IR sensors 120 may include thermal imaging devices, IR scene projectors, or other IR sensor devices capable of generating IR data. The one or more cameras 124 may include digital cameras or other similar devices, such as charge-coupled devices, to detect electromagnetic radiation in the visual range or other wavelengths. In some embodiments, the IR sensors 120 or cameras 124 may include illumination devices to stimulate emission within a targeted range. The IR sensors 120 or cameras 124 may be disposed at various locations within the vehicle 108 to obtain a more complete view of the vehicle cabin or passenger compartment. In a preferred embodiment, IR sensors 120 may be disposed at between six and ten separate locations within the vehicle 108 to obtain optima coverage without unnecessary overlap between the sensor data from each location. In some embodiments, the system 100 may include various physiological sensors (not shown) in addition to the IR sensors 120 and cameras 124. Any of the sensors within the vehicle 108 may be installed by the manufacturer of the vehicle 108 or as an aftermarket modification to the vehicle 108. The mobile device 110 or the on-board computer 114 may further interface with various output devices in the vehicle 108, such as one or more speakers 122 or displays (not shown). The sensors may also include other sensors currently existing or later developed.

In some embodiments, the on-board computer 114 may supplement the functions performed by the mobile device 110 described herein. In another embodiment, the on-board computer 114 may perform all of the functions of the mobile device 110 described herein, in which case no mobile device 110 may be present in the system 100. In yet another embodiment, the mobile device 110 may perform all of the functions of the on-board computer 114, in which case no on-board computer 114 may be present in the system 100. The mobile device 110 or on-board computer 114 may communicate with the network 130 over links 112 and 118, respectively. Additionally, the mobile device 110 and on-board computer 114 may communicate with one another directly over link 116.

The on-board computer 114 may be a general-use on-board computer capable of performing many functions relating to vehicle operation or a dedicated computer for monitoring vehicle occupants. Further, the on-board computer 114 may be installed by the manufacturer of the vehicle 108 or as an aftermarket modification to the vehicle 108. The mobile device 110 may be either a general-use mobile personal computer, cellular phone, smart phone, tablet computer, or wearable device (e.g., a watch, glasses, etc.) or a dedicated vehicle occupant monitoring device. In some embodiments, the mobile device 110 or on-board computer 114 may be thin-client devices that outsource some or most of the processing to the server 140.

One or more vehicle operators 106 may operate the vehicle 108. While shown in a slightly reclined sitting position, those of ordinary skill in the art will appreciate that the vehicle operator 106 could be situated in any number of ways (e.g., reclining at a different angle, standing, etc.) and may operate the vehicle 108 using controls other than the steering wheel and pedals shown in FIG. 1 (e.g., one or more sticks, yokes, levers, etc.). Additionally, one or more additional occupants (not shown) may be passengers within the vehicle 108. They system 100 may monitor the characteristics and/or activity of vehicle operators 106 and other occupants of the vehicle 108.

One or more feedback devices 128 may be included within the vehicle 108. Such feedback devices 128 may include massage devices, heaters, coolers, or other similar devices, which may be disposed within a seat, steering wheel, or other portions of the vehicle 108. The one or more feedback devices 128 may be communicatively connected to and controlled by the mobile device 110 or the on-board computer 114.

In some embodiments, the front-end components 102 may communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these, etc. Where the network 130 comprises the Internet, data communications may take place over the network 130 via an Internet communication protocol.

The back-end components 104 include one or more servers 140. Each server 140 may include one or more computer processors 162 adapted and configured to execute various software applications and components of the vehicle occupant monitoring system 100, in addition to other software applications. The server 140 may further include a database 146, which may be adapted to store data related to the operation of the vehicle occupant monitoring system 100. Such data might include, for example, user profiles, images, sensor outputs, data analyzed according to the methods discussed below, or other kinds of data pertaining to the vehicle occupants that has been uploaded to the server 140 via the network 103. The server 140 may access data stored in the database 146 when executing various functions and tasks associated with the operation of the vehicle occupant monitoring system 100.

The server 140 may have a controller 155 that is operatively connected to the database 146 via a link 156. It should be noted that, while not shown, additional databases may be linked to the controller 155 in a known manner. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example. The controller 155 may also be operatively connected to the network 130 via a link 135.

The server 140 may further include a number of software applications stored in a program memory 160. The various software applications may include a monitoring application 142 for processing sensor data, determining occupant characteristics, determining abnormal situations, and/or generating user profiles using the processor 162 of the server 140. The software applications may further include a response application 143 for determining and/or causing implementation of responses to abnormal situations.

Although the vehicle occupant monitoring system 100 is shown to include one mobile device 110, one on-board computer 114, and one server 140, it should be understood that different numbers of mobile devices 110, on-board computers 114, and servers 140 may be utilized. For example, the system 100 may include a plurality of servers 140 and hundreds of mobile devices 110 or on-board computers 114, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information as well as periodic uploads and downloads of information. This may in turn support a thin-client embodiment of the mobile device 110 or on-board computer 114.

Exemplary Computing Device

Figure 2:
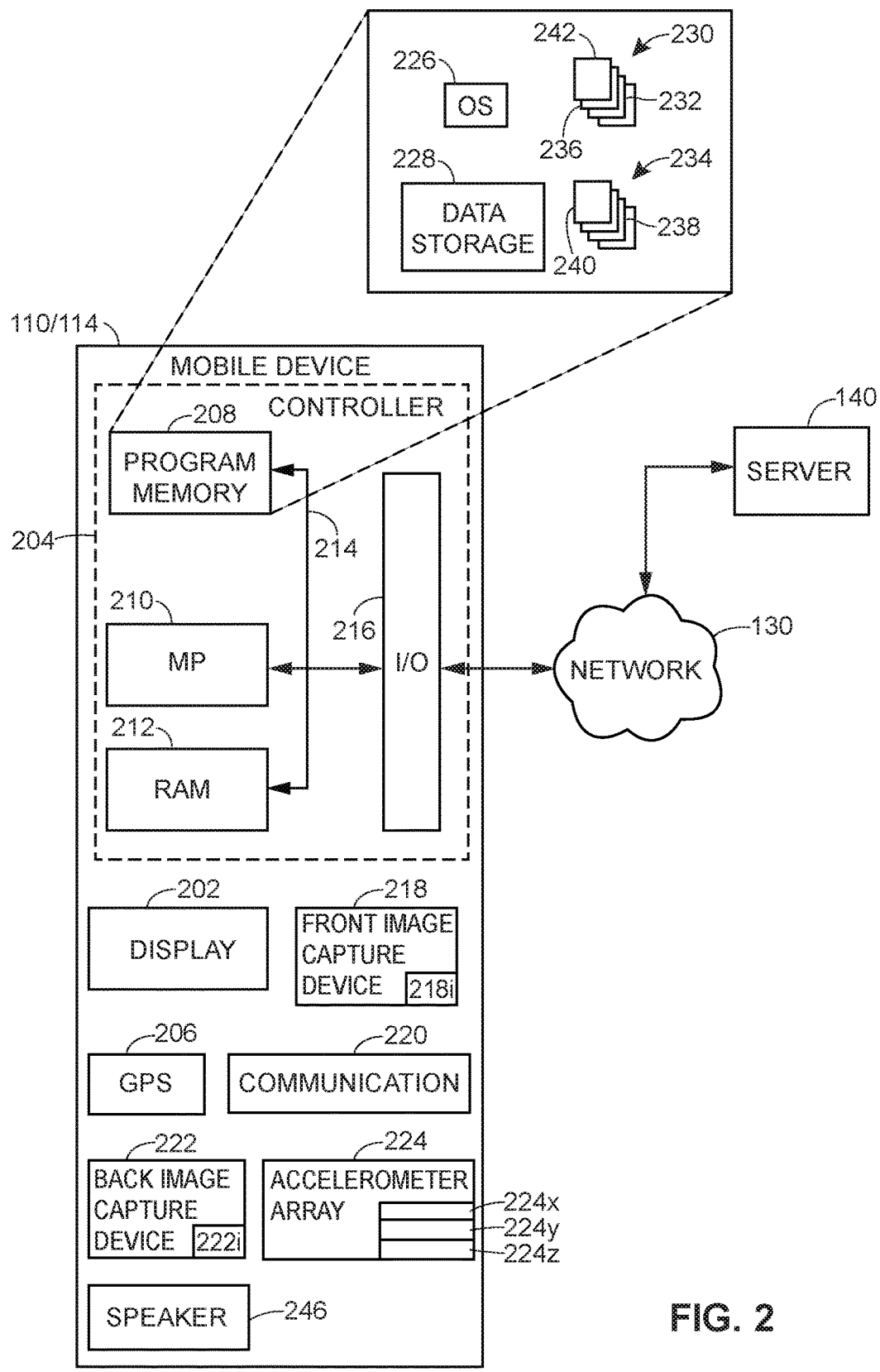
FIG. 2 illustrates a block diagram of an exemplary mobile device or an on-board computer for use in the vehicle occupant monitoring system.

FIG. 2 illustrates a block diagram of an exemplary mobile device 110 or an on-board computer 114 for use in the vehicle occupant monitoring system 100. Part or all of the sensor data may come from sensors incorporated within or connected to the mobile device 110 or on-board computer 114. Additionally, or alternatively, the communication unit 220 may receive sensor data from one or more external sensors within the vehicle 108. The sensor data may be processed by the controller 204 to determine information regarding the occupants within the vehicle 108. When the controller 204 determines that an abnormal situation exists, appropriate responses may be determined using the controller 204 based upon the type of abnormal situation identified by the sensor data. Different types of abnormal situations and appropriate responses are described in further detail below. The mobile device 110 or on-board computer 114 may then control the implementation of the response. In some instances, this may include presenting alerts to the vehicle operator 108 using the display 202, speakers 122 or 246, feedback devices 128, and/or other appropriate output devices (not shown). Additionally, or alternatively, the mobile device 110 or on-board computer 114 may transmit the sensor data to the server 140 for processing or may receive responses determined by the server 140 for implementation within the vehicle 108 via the network 130.

The mobile device 110 or on-board computer 114 may include a display 202, a Global Positioning System (GPS) unit 206, a communication unit 220, a front image capture device 218, a back image capture device 222, an accelerometer array 224, one or more additional sensors (not shown), a user-input device (not shown), a speaker 246, and, like the server 140, a controller 204. In some embodiments, the mobile device 110 and on-board computer 114 may be integrated into a single device, or either may perform the functions of both. Functions performed by either the mobile device 110 or the on-board computer 114 may also be performed by the mobile device 110 in concert with the on-board computer 114.

Similar to the controller 155, the controller 204 includes a program memory 208, one or more microcontrollers or microprocessors (MP) 210, a RAM 212, and an I/O circuit 216, all of which are interconnected via an address/data bus 214. The program memory 208 includes an operating system 226, a data storage 228, a plurality of software applications 230, and a plurality of software routines 234. The operating system 226, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 228 may include data such as user profiles and preferences, application data for the plurality of applications 230, routine data for the plurality of routines 234, and other data necessary to interact with the server 140 through the network 130. In some embodiments, the controller 204 may also include, or otherwise be communicatively connected to, other data storage mechanisms (e.g., one or more hard disk drives, optical storage drives, solid state storage devices, etc.) that reside within the mobile device 110 or on-board computer 114.

As discussed with reference to the controller 155, it should be appreciated that although FIG. 2 depicts only one microprocessor 210, the controller 204 may include multiple microprocessors 210. Similarly, the memory of the controller 204 may include multiple RAMs 212 and multiple program memories 208. Although the FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

The communication unit 220 may communicate with one or more external sensors within the vehicle 108 (including IR sensors 120 and/or cameras 124), mobile devices 110, on-board computers 114, or servers 140 via any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 220 may also be capable of communicating using a near field communication standard (e.g., ISO/IEC 18092, standards provided by the NFC Forum, etc.). Furthermore, the communication unit 220 may provide input signals to the controller 204 via the I/O circuit 216. The communication unit 220 may also transmit sensor data, device status information, control signals, or other output from the controller 204 to one or more external sensors within the vehicle 108, mobile devices 110, on-board computers 114, or servers 140. In some embodiments, the communication unit 220 of the on-board computer 114 may communicate (via a wired connect, Bluetooth, NFC, etc.) with the communication unit 220 of the mobile device 110 to establish a communications link between the two devices. This may be particularly advantageous in embodiments in which the mobile device 110 is a smartphone associated with the vehicle operator 106 or other vehicle occupants, which smartphone may utilize the speakers, microphones, and/or displays installed within the vehicle 108.

The GPS unit 206 may use "Assisted GPS" (A-GPS), satellite GPS, or any other suitable global positioning protocol (e.g., the GLONASS system operated by the Russian government) or system that locates the position of the mobile device 110 or on-board computer 114. For example, A-GPS utilizes terrestrial cell phone towers or Wi-Fi hotspots (e.g., wireless router points) to more accurately and more quickly determine location of the mobile device 110 or on-board computer 114, while satellite GPS generally is more useful in remote regions that lack cell towers or Wi-Fi hotspots.

The one or more IR sensors 120 and/or cameras 124 may include the image capture devices 218 or 222. The front and back image capture devices 218 and 222 may be built-in cameras within the mobile device 110 or on-board computer 114. Additionally, or alternatively, they may be peripheral cameras, such as webcams, dashcams, or other cameras installed inside or outside the vehicle 108 that are communicatively coupled with the mobile device 110 or on-board computer 114. The front image capture device 218 may be oriented toward the vehicle operator 106 to observe the vehicle operator 106 as described below. The back image capture device 222 may be oriented toward the front of the vehicle 108 to observe a road, lane markings, or other objects in front of the vehicle 108. Some embodiments may have both a front image capture device 218 and a back image capture device 222, but other embodiments may have only one or the other. Further, either or both of the front image capture device 218 and back image capture device 222 may include an infrared illuminator 218$i$, 222$i$, respectively, or other device to facilitate low light or night image capturing. Such infrared illuminators 218$i$ and 222$i$ may be automatically activated when light is insufficient for image capturing.

The accelerometer array 224 may include one or more accelerometers positioned to determine the force and direction of movements of the mobile device 110 or on-board computer 114. In some embodiments, the accelerometer array 224 may include an X-axis accelerometer 224$x$, a Y-axis accelerometer 224$y$, and a Z-axis accelerometer 224$z$ to measure the force and direction of movement in each dimension respectively. It will be appreciated by those of ordinary skill in the art that a three dimensional vector describing a movement of the mobile device 110 or on-board computer 114 through three dimensional space can be established by combining the outputs of the X-axis, Y-axis, and Z-axis accelerometers 224$x$, $y$, $z$ using known methods.

Furthermore, the mobile device 110 or on-board computer 114 may also include (or be coupled to) other sensors such as a thermometer, microphone, thermal image capture device, electroencephalograph (EEG), galvanic skin response (GSR) sensor, heart rate sensor, other biometric sensors, etc. Physiological sensor data may be used to measure indications that the vehicle operator 106 is impaired, experiencing a medical emergency, or experiencing another abnormal condition. A thermometer or thermal image capture device may be used to determine an abnormal body temperature or a change in body temperature of the vehicle operator 106 that may indicate stress or drowsiness, for example. A microphone may be used to receive voice inputs, and may also be used to detect irregularities in the voice of the vehicle operator 106 indicating that vehicle operator 106 is agitated or under stress. An EEG may be used to determine whether a vehicle operator 106 is stressed, distracted, or otherwise impaired. A GSR sensor may be used to detect whether the vehicle operator 106 is stressed (i.e., that the conductance of the vehicle operator's 106 skin has varied from its normal level). Other biometric sensors may similarly be used to detect whether a vehicle operator 106 is in an impaired state.

The mobile device 110 or on-board computer 114 may include a user-input device (not shown). The user-input device may include a "soft" keyboard that is displayed on the display 202 of the mobile device 110 or on-board computer 114, an external hardware keyboard communicating via a wired or a wireless connection (e.g., a Bluetooth keyboard), an external mouse, a microphone, or any other suitable user-input device. The user-input device may also include a microphone capable of receiving user voice input, such as the microphone 126.

The one or more processors 210 may be adapted and configured to execute any of one or more of the plurality of software applications 230 or any one or more of the plurality of software routines 234 residing in the program memory 204, in addition to other software applications. One of the plurality of applications 230 may be a monitoring application 232 that may be implemented as a series of machine-readable instructions for performing the various tasks associated with implementing part or all of the data collection and assessment functions of the vehicle occupant monitoring system 100. One of the plurality of applications 230 may be a response application 236 that may be implemented as a series of machine-readable instructions for determining and implementing an appropriate response to an abnormal situation. Another application of the plurality of applications may include a communication application 242 that may be implemented as a series of machine-readable instructions for sending and receiving electronic communications through the network 130, including telephonic communications. One of the plurality of routines may include an image capture routine 238 that coordinates with the front image capture device 218 or back image capture device 222 to retrieve image data for use with one or more of the plurality of applications, such as the monitoring application 232, or for use with other routines. Another routine in the plurality of routines may include a profile access routine 240 that retrieves, modifies, and/or stores user profiles in the data storage 228 of the mobile device 110 or on-board computer 114 or the database 146 of the server 140.

A user may launch the monitoring application 232 from the mobile device 110 or on-board computer 114 in order to initiate operation of the vehicle occupant monitoring system 100 to monitor and respond to abnormal or emergency situations. Additionally, or alternatively, the vehicle occupant monitoring system 100 may automatically begin monitoring the vehicle occupants when the vehicle 108 is started. In some embodiments, the vehicle occupant monitoring system 100 may automatically monitor the vehicle 108 for occupants on a continuous basis, regardless of whether the vehicle 108 is in use or is not in use.

In embodiments where the mobile device 110 or on-board computer 114 is a thin-client device, the server 140 may perform many of the processing functions remotely that would otherwise be performed by the mobile device 110 or on-board computer 114. In such embodiments, the mobile device 110 or on-board computer 114 may gather data from its sensors or other sensors as described herein. Rather than analyzing the data locally, however, the mobile device 110 or on-board computer 114 may instead send the data to the server 140 for remote processing. The server 140 may perform the analysis of the gathered data to determine whether an abnormal situation exists. If the server 140 determines that an abnormal situation exists, the server 140 may determine one or more appropriate responses to the situation. The server 140 may then command the mobile device 110 or on-board computer 114 to implement the one or more responses, as described below. Additionally, the server 140 may generate metrics and suggestions regarding vehicle usage based on the gathered data.

Exemplary Data Collection

Each authorized vehicle operator 106 or usual passenger may have an associated user profile created by the vehicle occupant monitoring system 100. The user profile may include information relating to the usual characteristics of the user, such as facial features, resting heart rate, or vocal patterns. The user profile may further include information regarding the user's connection with the vehicle (e.g., an insured driver, an authorized passenger, an unknown occupant, etc.). In some embodiments, the profile may further include information regarding a mobile device 110 associated with the user, such as a smartphone. The user profile may be used by the vehicle occupant monitoring system 100 during monitoring to distinguish between occupants within the vehicle 108 and/or to determine abnormal situations based upon deviations from user characteristics or preferences stored in the user profile.

Figure 3:
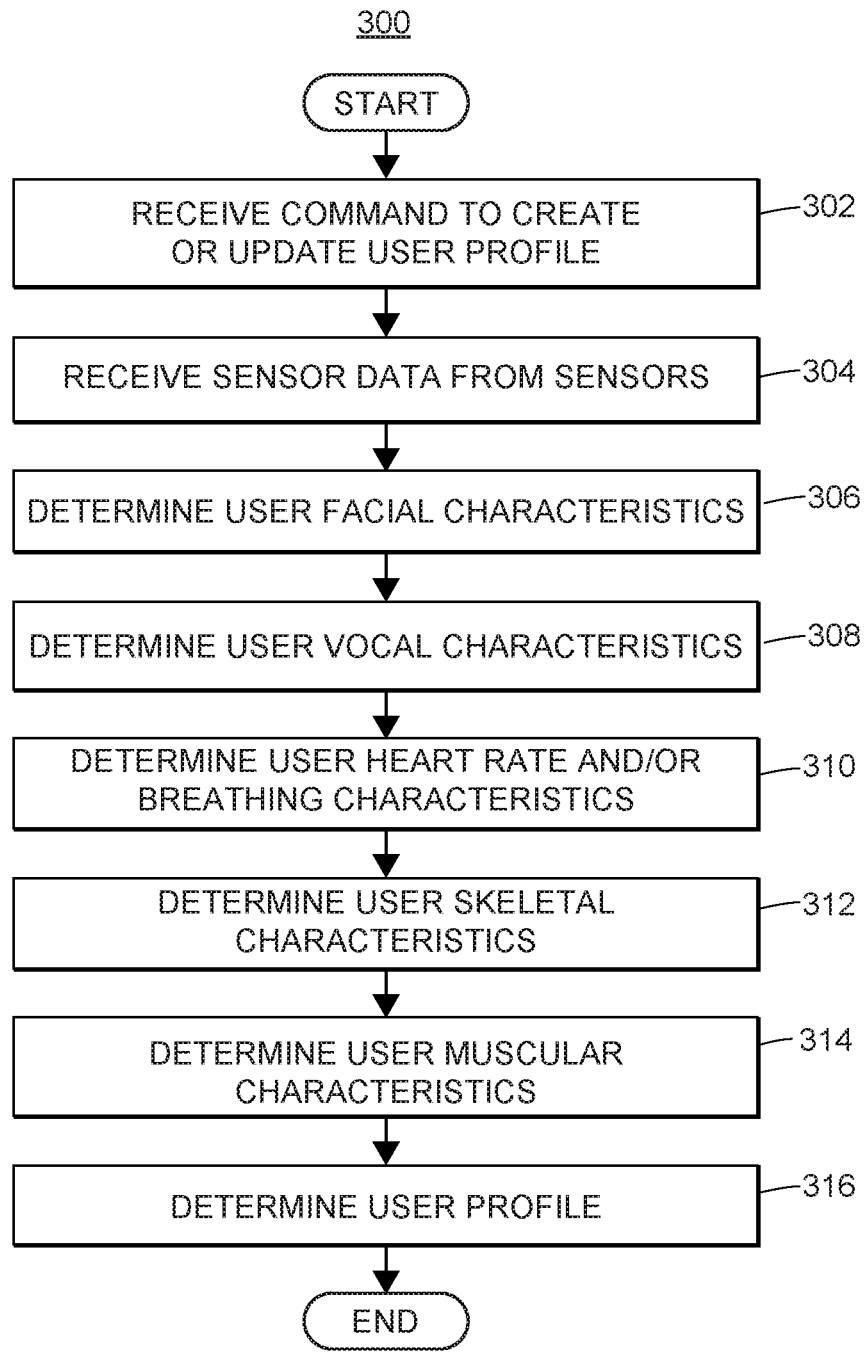
FIG. 3 illustrates a flow diagram of an exemplary embodiment of a user profile generation method for creating or updating a user profile.

FIG. 3 illustrates a flow diagram of an exemplary embodiment of a user profile generation method 300 for creating or updating a user profile. The method 300 may be implemented by the mobile device 110 or on-board computer 114 using the sensors disposed within the vehicle 108 to obtain and process sensor data associated with a user. The method 300 may be implemented for each of a plurality of occupants of the vehicle 108 to create a new user profile or update a user profile for each occupant. The user profiles may then be stored in the data storage 228 of the mobile device 110 or on-board computer 114 or may be transmitted through the network 130 to be stored in the database 146. Although the method 300 is described below as being implemented using the on-board computer 114, some or all of the steps may likewise be implemented using the mobile device 110, the server 140, or a combination of some or all of these.

At block 302, the on-board computer 114 may receive a command to create or to update a user profile associated with a user who is an occupant of the vehicle 108. The command may be entered by the user, in some embodiments, or the command may be automatically generated by the on-board computer 114. For example, the on-board computer 114 may automatically implement the method 300 upon determining the presence of an occupant in the vehicle 108 for whom no associated user profile can be located in the data storage 228 or database 146. The method 300 may continue to be implemented during vehicle operation or across multiple vehicle trips until sufficient data has been collected to ensure reliability and accuracy of the user profile.

At block 304, the on-board computer 114 may receive sensor data from some or all of the sensors within the vehicle 108. Specifically, the received sensor data may include data from one or more IR sensors 120, cameras 145, and/or microphones 126. In some embodiments, the sensors or the on-board computer 114 may process the raw sensor data to produce a generalized data set that is more directly usable in the following blocks 306-314. The IR sensor data may include a point cloud of data points in three dimensions, derived from two-dimensional images received at the one or more IR sensors 120 and data values indicating distance from the IR sensors 120. For example, IR scene projection techniques may be implemented by the IR sensors 120 or the on-board computer 114 to produce a projection of the scene observed by the one or more IR sensors. Similarly, image from a plurality of cameras 124 may be combined to produce a three-dimensional image, such as may be used in facial recognition techniques.

At block 306, the on-board computer 114 may determine user facial characteristics from the sensor data. This may involve combining data from a plurality of sensors of the same or different types (e.g., combining data from IR sensors 120 and cameras 124). Facial recognition algorithms and processes may be used to determine salient facial features uniquely (or with a high degree of statistical certainty) associated with the user. Such features may be related to the shape, size, angle, color, contours, or relative dimensions of the eyes, nose, forehead, mouth, chin, ears, or face as a whole.

At block 308, the on-board computer 114 may determine user vocal characteristics using sensor data from the microphone 126. Such vocal characteristics may include the pitch, volume, timbre, duration, or patterns of the voice or speech of the user. Frequency analysis may be performed by the on-board computer 114 to determine a voice print or subprofile indicating information regarding the user's vocal characteristics, which may be used to identify the user.

At block 310, the on-board computer 114 may determine user heart rate characteristics and/or breathing characteristics. Sensor data from the IR sensors 120 and/or cameras 124 may be used to determine minor changes in the flushness of the user's skin to identify systolic and diastolic points within the cardiac cycle of the user. Such cyclical changes may be identified by changes in volume, temperature, or color in the sensor data. In some embodiments, the microphone 126 may also be used to identify hear rate by sound. In addition to the heart rate, the pattern of expansion and contraction associated with the cardiac cycle of the user may be determined as a user characteristic associated with the user heartbeat. User breathing characteristics may similarly be determined based upon sensor data received from the sensors within the vehicle 108. The user breaching characteristics may include respiration rate, intensity, volume, pattern, sound pattern, and/or composition. For example, the IR sensor data may be used to determine the moisture content of the user's breath.

At block 312, the on-board computer 114 may determine user skeletal characteristics based upon the sensor data. This may include using the IR data to identify user joints and skeletal segments between the joints. In some embodiments, this may include observing user movement over a period of time to identify joints and segments, which may be connected in a computer model to form a functional approximate of the user's skeleton. This may further include determining the relative and/or absolute sizes and positions of the user's head, neck, torso, and limbs. Additionally, normal ranges of motion may be determined for joints. In further embodiments, information regarding the user's posture may be determined as part of the user skeletal characteristics.

At block 314, the on-board computer 114 may further determine user muscular characteristics. This may involve modeling the user's musculature based in part upon the model of the user's skeleton developed at block 312. The sensor data may be used to determine muscle groups or conditions of the user, particularly temperature or flushness (which may indicate an increased level of blood flow to the muscles of a region of the user's body). Such characteristic data may be useful in later determining user fatigue or illness.

At block 316, the on-board computer 114 may determine a user profile (or an update to an existing user profile) based upon the determined user characteristics. In some embodiments, further user characteristics may be determined, such as movement characteristics, that may also be included in the user profile. In further embodiments, additional information pertaining to the user may be included in the user profile, along with the user characteristics. For example, an indication of a mobile phone associated with the user may be included, which may facilitate management of the user's phone based upon whether the user is operating the vehicle or riding in the vehicle as a passenger. As another example, medical information or emergency contact information associated with the user may be included in the user profile, in case of medical or other emergency. In some embodiments, information regarding user authorization with respect to one or more vehicles may be included in the user profile.

Exemplary Abnormal Situation Detection

The vehicle occupant monitoring system 100 may be used to monitor the occupants of the vehicle 108 during vehicle operation to determine whether an abnormal situation has occurred. In some embodiments, monitoring may continue even when the vehicle is not in operation. If an abnormal situation is identified, the vehicle occupant monitoring system 100 may then take appropriate actions to respond to the situation. In some embodiments, user profiles may be used to determine abnormal situations by comparing sensor data obtained during monitoring with normal ranges for occupants of the vehicle 108 established in the user profiles.

Figure 4:
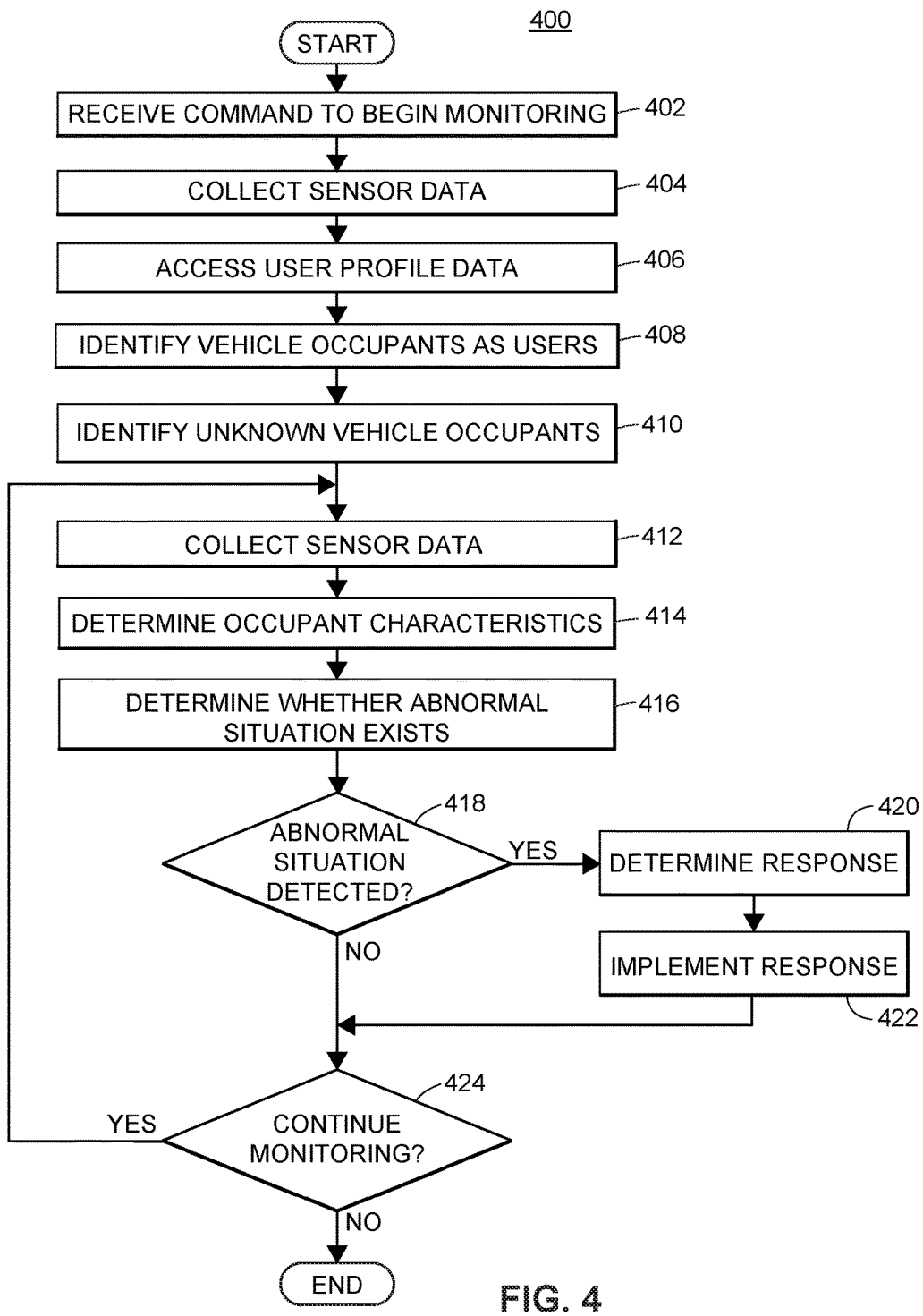
FIG. 4 illustrates a flow diagram of an exemplary embodiment of a monitoring and response method that may be implemented using the exemplary vehicle occupant monitoring system.

FIG. 4 illustrates a flow diagram of an exemplary embodiment of a monitoring and response method 400 that may be implemented by the vehicle occupant monitoring system 100. At block 402, the method may begin with receiving a command to begin monitoring the occupants of the vehicle 108. Sensor data may be collected at block 404 and compared with profiles accessed at block 406 to identify one or more vehicle occupants at block 408. Unknown vehicle occupants for whom matching user profiles could not be found may be identified as such at block 410, and new profiles may be created for such unknown occupants in some embodiments. At blocks 412-424, the vehicle occupants may be monitored using sensor data to determine whether any abnormal situations arise. Sensor data may be collected at block 412, from which current occupant characteristics may be determined at block 414. The current occupant characteristics may be compared against user profiles or other known patterns at block 416 to determine whether an abnormal situation exists. When an abnormal situation is determined to exist at block 418, an appropriate response may be determined and implemented, respectively, at blocks 420 and 422. At block 424, the method 400 may determine whether to continue monitoring the vehicle occupants. If monitoring will continue, the method 400 may continue at block 412 by collecting further sensor data. If monitoring is finished, the method 400 may terminate. Although the method 400 is described below as being implemented using the on-board computer 114, some or all of the steps may likewise be implemented using the mobile device 110, the server 140, or a combination of some or all of these.

At block 402, the on-board computer 114 may receive a command to monitoring occupants within the vehicle 108. The command may be entered by the user, in some embodiments, or the command may be automatically generated by the on-board computer 114. For example, the on-board computer 114 may automatically implement the method 400 upon determining the presence of an occupant in the vehicle 108 or when the vehicle is started. The method 400 may continue to be implemented while the vehicle remains in operation. In some embodiments, the method 400 may continue to monitor any occupants within the vehicle even after vehicle operation has concluded.

At block 404, the on-board computer 114 may collect sensor data from the sensors within the vehicle. In particular, sensor data may be collected from one or more IR sensors 120, cameras 124, and/or microphones 126. The sensor data may be collected for a short period of time, which may be taken as a snapshot of the vehicle occupants. Based upon the sensor data, the on-board computer 114 may determine a number of occupants of the vehicle, including types of occupants (e.g., child, infant, adult, etc.). In some embodiments, the on-board computer 114 may process part or all of the received sensor data to determine occupant characteristics for comparison against occupant characteristics stored in user profiles, as discussed above.

At block 406, the on-board computer 114 may access one or more user profiles stored in the data storage 228 or the database 146. The user profiles may be selected from a set of user profiles associated with the vehicle 108. Additionally, or alternatively, the user profiles may be searched based upon the sensor data collected at block 404 to find matches.

At block 408, the on-board computer 114 may identify one or more vehicle occupants as users based upon the user profiles. This may include regressing the sensor data or derived occupant characteristics against data stored in a plurality of user profiles to determine a probability of a match between one or more occupants and one or more user profiles. If no match can be found in the user profiles accessed at block 406, the on-board computer 114 may attempt to find a match with additional user profiles stored in the system memory 228 or the database 146. Additionally, or alternatively, the on-board computer 114 may collect further sensor data and attempt to determine the identities of the one or more vehicle occupants using the new sensor data. If the identity of one or more of the vehicle occupants cannot be determined with sufficient certainty, then the on-board computer 114 may identify such occupants as unknown occupants at block 410.

At block 410, the on-board computer 114 may identify as unknown occupants any vehicle occupants who could not be identified at block 408. In some embodiments, the presence of unknown occupants may be considered an indicator of an abnormal situation. In further embodiments, the on-board computer 114 may generate a new user profile for each unknown occupant according the method 300 above. Sensor data (including images) may be automatically uploaded to the server 140 and stored in the database 146 for any unknown occupants, in some embodiments. This may facilitate loss recovering the case of theft and may serve as a deterrent.

At blocks 412-424, the on-board computer 114 may continue monitoring the vehicle occupants (and responding to any abnormal situations that are detected) until the method 400 terminates. At block 412, the on-board computer 114 may collect further sensor data from the one or more sensors disposed within the vehicle 108. Sensor data from one or more IR sensors 120, cameras 124, microphones 126, or other sensors within the vehicle 108 may be continuously or periodically obtained, processed, and/or stored by the on-board computer 114. In some embodiments, processed or raw sensor data may be transmitted to the server 140 via the network 130. The server 140 may then process and/or store the data or information derived therefrom in the database 146. In some embodiments, part or all of the data or information derived therefrom may be further communicated from the server 140 to one or more third parties (such as emergency services) via the network 130.

At block 414, the on-board computer 114 may process the data to determine occupant characteristics associated with one or more users and/or other occupants of the vehicle 108. As discussed above, the determined occupant characteristics may include facial characteristics, vocal characteristics, heart rate characteristics, breathing characteristics, skeletal characteristics, muscular characteristics, and/or other characteristics associated with each occupant.

At block 416, the on-board computer 114 may determine whether an abnormal situation exists based upon the occupant characteristics determined at block 414. The on-board computer 114 may compare the determined occupant characteristics with information retrieved from the user profile associated with the occupant to determine whether an abnormal situation exists. This may include determining whether one or more occupant characteristics determined from the sensor data are outside a range of normal values for such occupant characteristics based upon the user profile associated with the occupant. In some embodiments, information regarding a plurality of occupant characteristics or a plurality of occupants may be used to determine whether an abnormal situation exists. Based upon the sensor data, occupant characteristics, and/or user profiles, more than one type of abnormal situation may be identified for each of one or more vehicle occupants in some instances. Examples of determining and responding to various types of abnormal situations are presented below with FIGS. 5-13.

At block 418, the on-board computer 114 may determine whether one or more abnormal situations have been determined to exist at block 416. If no abnormal situations are determined to exist, the method 400 may continue at block 424. If at least one abnormal situation has been determined to exist, the on-board computer 114 may determine one or more appropriate responses to the abnormal situation at block 420.

In determining an appropriate response at block 420, the on-board computer 114 may base the response, at least in part, upon whether the abnormal situation relates to the vehicle operator 106 or a passenger within the vehicle 108, as well as whether there are passengers within the vehicle. For example, the on-board computer 114 may determine to present an alert regarding an abnormal situation involving a passenger, whereas the same abnormal situation would result in a determination to adjust or control operation of the vehicle 108 if it were to involve the vehicle operator 106. Similarly, the appropriate response determination may be dependent upon whether unknown occupants are in the vehicle or whether the abnormal situation involves one or more unknown occupants. User preferences stored in the user profiles may also be used in determining appropriate responses to abnormal situations.

The on-board computer 114 may further determine risk levels associated with a plurality of possible responses, which risk levels may be compared to determine one or more responses that reduce or minimize risk. In some embodiments, the on-board computer 114 may determine one or more responses to reduce risk levels below an acceptable limit or threshold, which may include determining responses having the lowest cost or that are the least intrusive that are determined to accomplish such risk reduction to acceptable levels. In further embodiments, the determined response to an abnormal situation may include taking no action or simply continuing to monitor the vehicle occupants.

Once one or more appropriate responses to one or more abnormal situations are determined at block 420, the on-board computer 114 may implement the determined response or cause the determined responses to be implemented at block 422. This may include adjusting or controlling operation of the vehicle 108, such as turning on an autonomous or adaptive cruise control functionality of the vehicle 108 or piloting and parking the vehicle 108 in a safe location. Similarly, the on-board computer 114 may adjust the environment of the vehicle 108 to influence one or more occupants, such as by adjusting the temperature, opening windows, selecting music, or adjusting lighting levels within the vehicle 108. This may also include presenting alerts or warnings to one or more occupants, using speakers 122 or 246, displays 202, feedback devices 128, and/or mobile devices 110.

In some instances, the on-board computer 114 may cause telephonic or electronic communications to be initiated, such as by contacting an emergency service switchboard. In further embodiments, the appropriate response may include determining an adjustment to an insurance policy, such as an adjustment to a rating, premium, deductible, discount, or surcharge. Upon implementing the determined response or responses, the method 400 may continue at block 424.

In some embodiments, the on-board computer 114 may determine to provide access to sensor data or determined occupant characteristic data to a third party at block 420. For example, access to heart rate characteristics may be provided to medical professionals or an emergency response service if an occupant is determined to be experiencing a medical emergency. Such access may be determined based upon user preferences in a user profile or other information associated with the vehicle occupant. In some embodiments, this may include allowing emergency responders to locate and request access to relevant sensor or occupant characteristic information based upon a telephone number, location of the vehicle, or other identifying information. To implement such response at block 422, the on-board computer 114 may utilize the communication unit 220 of the on-board computer 114 or mobile device 110 to communicate through the network 140.

At block 424, the on-board computer 114 may determine whether monitoring should continue. In some embodiments, this may include determining whether the vehicle 108 is in user or whether any occupants are detected within the vehicle 108. In further embodiments, the method 400 may continue until manually terminated by an authorized user. In some embodiments, the occurrence of one or more events may cause the method 400 to terminate and restart at block 402. Such events may include engine ignition or vehicle start-up, entrance or exit of one or more vehicle occupants, or exceeding a time threshold of continuous operation of the method 400. If the on-board computer 114 determines that monitoring should continue at block 424, the method 400 may continue at block 412. If the on-board computer 114 determines that monitoring should not continue at block 424, the method 400 may terminate.

As noted above, the exemplary vehicle occupant monitoring system 100 and monitoring and response method 400 may determine and respond to a variety of abnormal situations. The following examples indicate some of these various abnormal situations and appropriate responses that may be detected and addressed by the system 100 and the method 400. Each of the following FIGS. 5-13 illustrates an exemplary embodiment of a monitoring and response method that may replace blocks 412-422 in the method 400 described above. Alternatively, each of the methods of FIGS. 5-13 may be independently implemented within a vehicle, such as by implementation using the exemplary vehicle occupant monitoring system 100. Although the methods 500-1200 are described below as being implemented using the on-board computer 114, some or all of the steps may likewise be implemented using the mobile device 110, the server 140, or a combination of some or all of these.

Exemplary Medical Emergency Monitoring & Response

Figure 5:
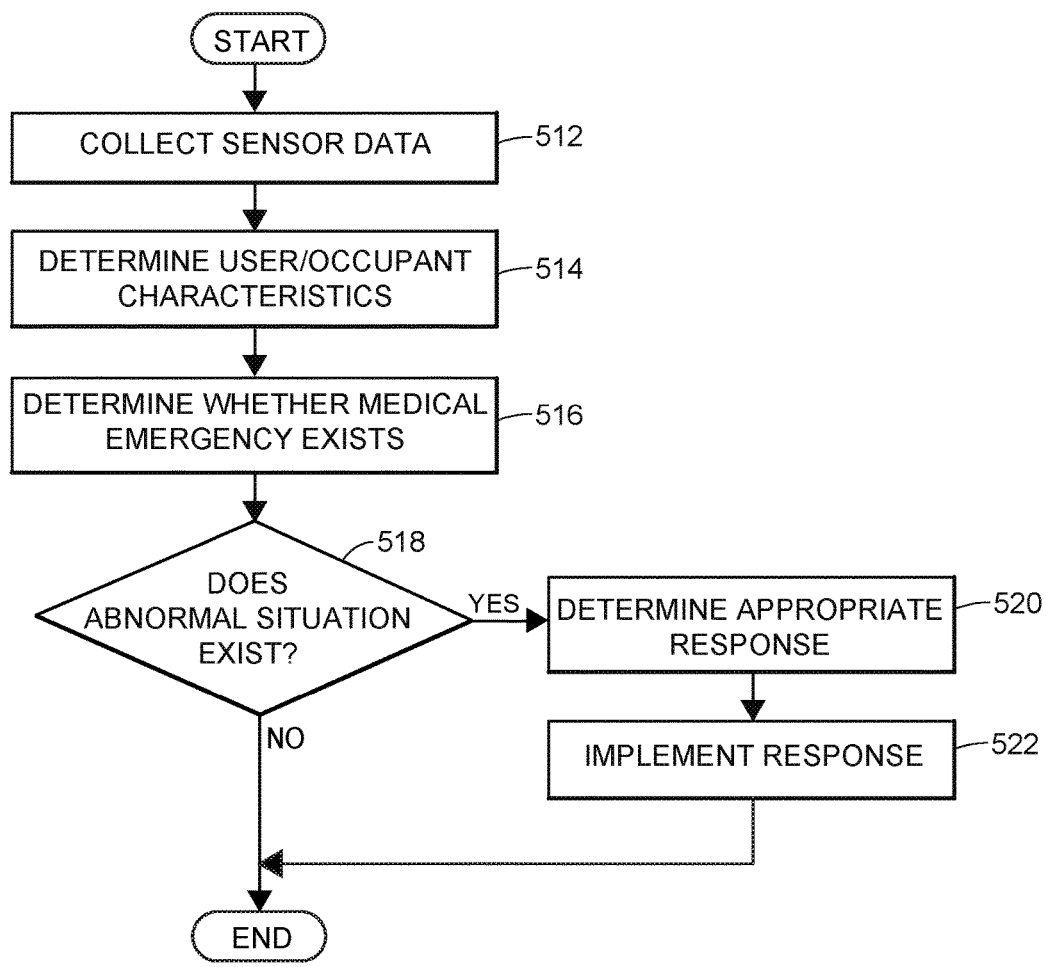
FIG. 5 illustrates a flow diagram of an exemplary medical emergency monitoring and response method that may be implemented by the vehicle occupant monitoring system.

FIG. 5 illustrates a flow diagram of an exemplary medical emergency monitoring and response method 500 that may be implemented by the vehicle occupant monitoring system 100. The method 500 may monitor vehicle occupants to determine when a medical emergency is occurring and respond appropriately.

At block 512, the on-board computer 114 may collect sensor data from one or more sensors within the vehicle 108.

Data from IR sensors 120 and/or cameras 124 may be particularly relevant for determining user characteristics associated with medical health or medical emergencies.

At block 514, the on-board computer 114 may determine one or more user or occupant characteristics associated with medical health or medical emergencies. User characteristics such as heart rate, pulse strength, heartbeat pattern, breathing rate, breathing volume, breathing pattern, facial features, vocal pattern, and/or skin temperature may be particularly relevant, though other characteristics may likewise be determined.

At block 516, the on-board computer 114 may compare the determined characteristics against user profile data to determine whether a medical emergency exists. For example, a heart rate that suddenly rises above or falls below a normal range for a vehicle occupant may be indicative of a heart attack or other acute medical condition, particularly if breathing or skin temperature characteristics likewise deviate from normal ranges. If no baseline user characteristics exist in a user profile for an occupant (such as an unknown occupant), a generic user profile may be used as a baseline. In such instances changes in occupant characteristics may be used to determine the existence of a medical emergency.

At block 518, the on-board computer 114 may determine whether an abnormal condition associated with a medical emergency has been determined to exist. If no such abnormal situation is found, the method 500 may terminate. If such an abnormal situation is found, the on-board computer may determine an appropriate response at block 520. The appropriate response may be determined based upon the received sensor data, determined occupant characteristics, the presence or absence of other occupants within the vehicle 108, and/or the nature and severity of the medical emergency. For example, an appropriate response to a severe medical emergency such as a heart attack of the vehicle operator 106 may include causing the vehicle 108 to pull out of traffic and initiate a telephone call with a medical emergency service.

In the same situation where a passenger within the vehicle 108 (rather than the vehicle operator 106) is having a heart attack, the on-board computer 114 may present an alert to the vehicle operator 106, along with directions to an appropriate medical facility based upon the vehicle's location (e.g., a hospital or emergency care center). If a less severe or acute medical emergency exists, the on-board computer 114 may provide an indication or alert to the occupants, such as by presenting an alert using the speaker 122 or 246, display 202, or feedback device 128, which may provide a haptic alert to the vehicle operator 106 or other occupant.

Once one or more appropriate responses have been determined, the on-board computer 114 may implement the determined responses at block 522 using the speaker 122 or 246, display 202, feedback device 128, communication unit 220, or other components of the system 100. The method 500 may then terminate.

Exemplary Impairment Monitoring & Response

Figure 6:
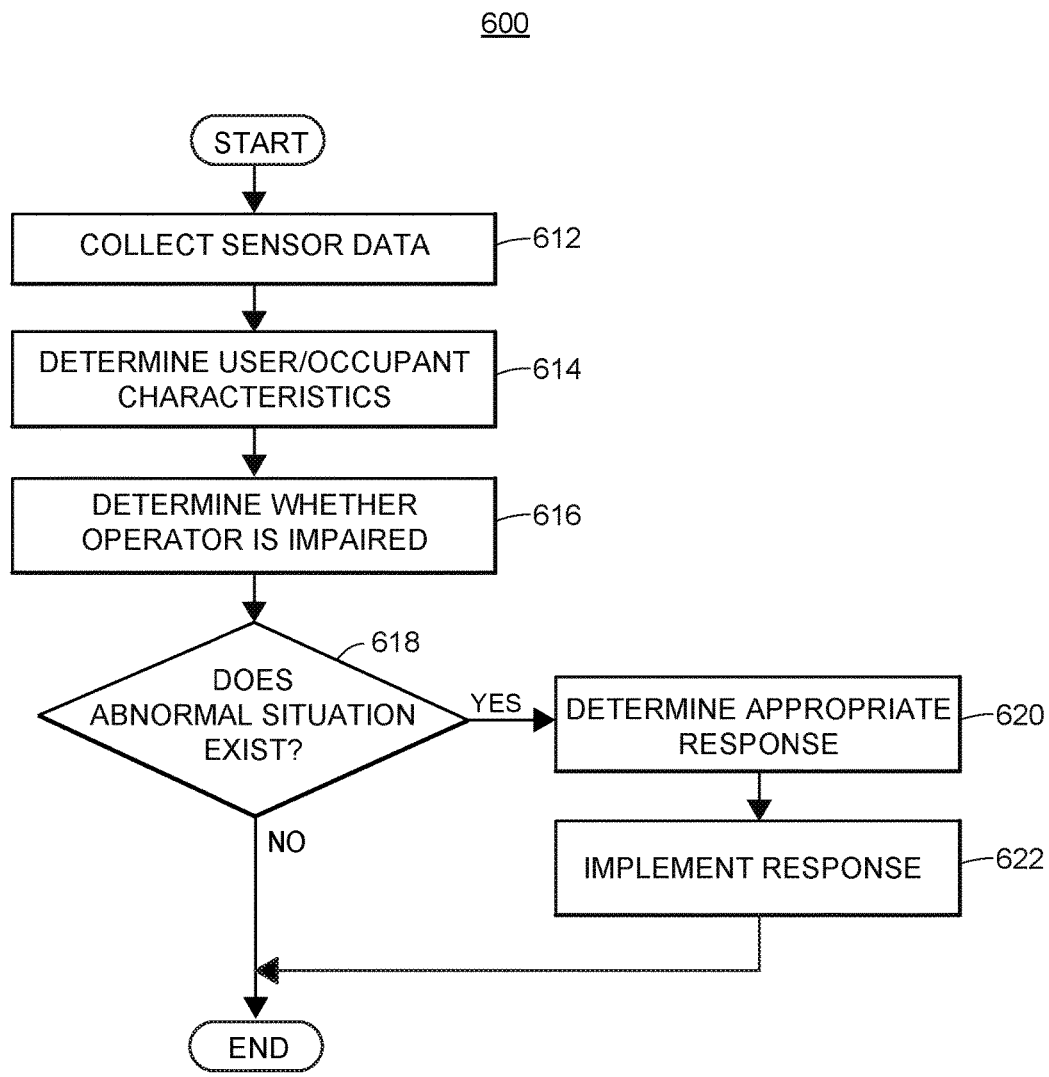
FIG. 6 illustrates a flow diagram of an exemplary impairment monitoring and response method that may be implemented by the vehicle occupant monitoring system.

FIG. 6 illustrates a flow diagram of an exemplary impairment monitoring and response method 600 that may be implemented by the vehicle occupant monitoring system 100. The method 600 may monitor vehicle occupants to determine when a vehicle operator 106 is impaired and respond appropriately. Such impairments may include physical impairments (e.g., medical emergencies, drowsiness, inebriation, etc.) or emotional impairments (e.g., rage, distraction, anxiety, etc.). In some embodiments, impairments of passengers within the vehicle 108 may similarly be determined.

At block 612, the on-board computer 114 may collect sensor data from one or more sensors within the vehicle 108. Data from IR sensors 120 and/or cameras 124 may be particularly relevant for determining user characteristics associated with operator impairments.

At block 614, the on-board computer 114 may determine one or more user or occupant characteristics associated with user impairments. User characteristics such as heart rate, pulse strength, heartbeat pattern, breathing rate, breathing volume, breathing pattern, facial features, vocal pattern, skin temperature, posture, movement, and/or interaction with items or occupants within the vehicle may be particularly relevant, though other characteristics may likewise be determined.

At block 616, the on-board computer 114 may compare the determined characteristics against user profile data to determine whether the user is impaired. For example, a slowly declining heart rate or breathing rate relative to the user's normal range, coupled with head drooping or lack of eye movement, may indicate that the vehicle operator is becoming drowsy. If no baseline user characteristics exist in a user profile for an occupant (such as an unknown occupant), a generic user profile may be used as a baseline. In such instances changes in occupant characteristics may be used to determine the existence of an impairment.

At block 618, the on-board computer 114 may determine whether an abnormal condition associated with a vehicle operator impairment has been determined to exist. If no such abnormal situation is found, the method 600 may terminate. If such an abnormal situation is found, the on-board computer may determine an appropriate response at block 620. The appropriate response may be determined based upon the received sensor data, determined occupant characteristics, the presence or absence of other occupants within the vehicle 108, and/or the nature of the impairment. For example, an appropriate response to a drowsy vehicle operator 106 may include playing upbeat music via the speaker 122 or 246, increasing lighting conditions within the vehicle cabin, and/or providing an alert to the vehicle operator 106 or other vehicle occupants. Alternatively, an appropriate response for an anxious or enraged vehicle operator 106 may include playing soothing music, adjusting the cabin air temperature, and/or operating a feedback device 128 to massage the vehicle operator 106.

If more severe or acute impairment exists, the on-board computer 114 may assume control of vehicle operation and/or stop the vehicle at a safe location out of traffic. In some embodiments, the on-board computer 114 may prevent the vehicle 108 from starting to operate if the operator is determined to be impaired. Additionally, or alternatively, the on-board computer 114 may provide an indication or alert to the occupants, such as by presenting an alert using the speaker 122 or 246, display 202, or feedback device 128, which may provide a haptic alert to the vehicle operator 106 or other occupant.

Once one or more appropriate responses have been determined, the on-board computer 114 may implement the determined responses at block 622 using the speaker 122 or 246, display 202, feedback device 128, communication unit 220, or other components of the system 100. The method 600 may then terminate.

Exemplary Inebriation Monitoring & Response

Figure 7:
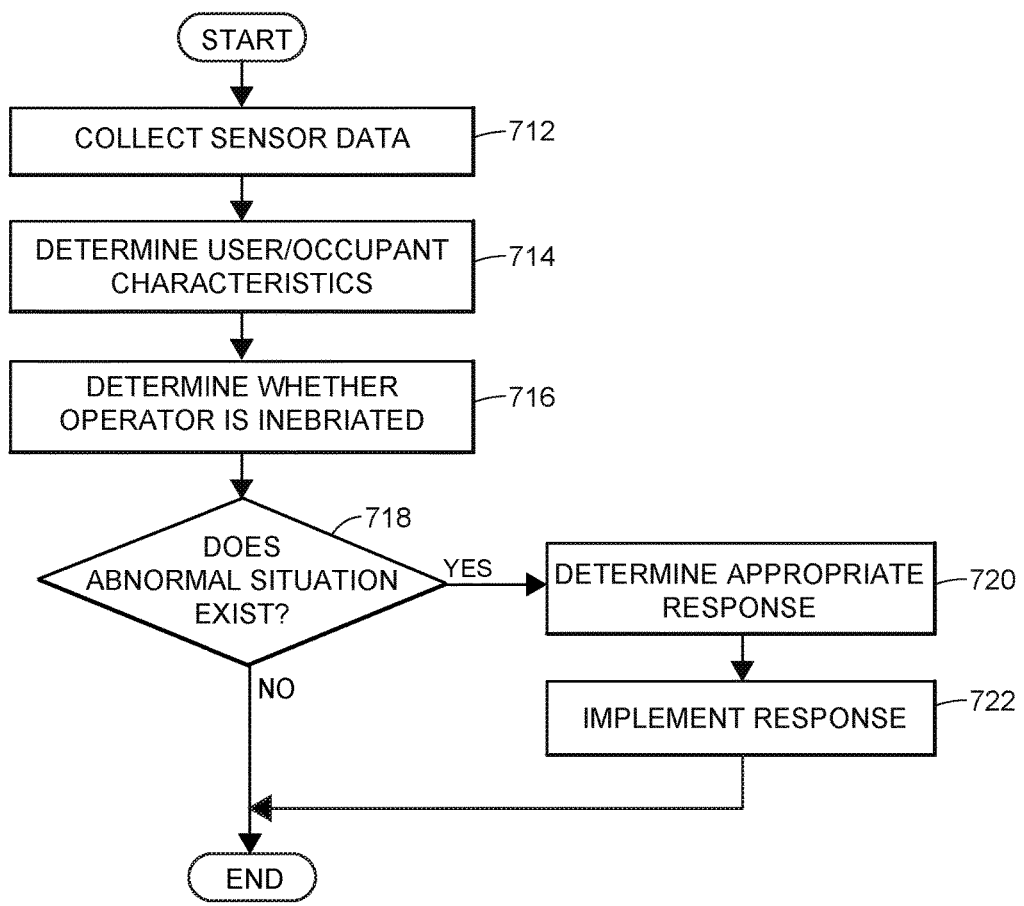
FIG. 7 illustrates a flow diagram of an exemplary inebriation monitoring and response method that may be implemented by the vehicle occupant monitoring system.

FIG. 7 illustrates a flow diagram of an exemplary inebriation monitoring and response method 700 that may be implemented by the vehicle occupant monitoring system 100. The method 700 may monitor vehicle occupants to determine when a vehicle operator 106 is inebriated and respond appropriately. In some embodiments, inebriation of passengers within the vehicle 108 may similarly be determined.

At block 712, the on-board computer 114 may collect sensor data from one or more sensors within the vehicle 108. Data from IR sensors 120 and/or cameras 124 may be particularly relevant for determining user characteristics indicative of inebriation.

At block 714, the on-board computer 114 may determine one or more user or occupant characteristics associated with inebriation. User characteristics such as breath composition, vocal patterns, skin temperature, posture, movement, and/or interaction with items or occupants within the vehicle may be particularly relevant, though other characteristics may likewise be determined. Of particular interest is IR refraction caused by alcohol molecules exhaled by the vehicle operator 106, which may be measured using the one or more IR sensors 120.

At block 716, the on-board computer 114 may compare the determined characteristics against user profile data and/or breath analysis data (which may be stored in the data storage 228 or database 146) to determine whether the user is inebriated. For example, statistically significant difference in observed IR sensor data (such as intensity or wavelength) from expected normal IR sensor data when the vehicle operator 106 breathes may be indicative of inebriation. If no baseline user characteristics exist in a user profile for an occupant (such as an unknown occupant), a generic user profile may be used as a baseline. In some embodiments, the on-board computer 114 may determine whether observed sensor data follows a pattern associated with inebriation, without reference to user-specific profile information.

At block 718, the on-board computer 114 may determine whether an abnormal condition associated with vehicle operator inebriation has been determined to exist. If no such abnormal situation is found, the method 700 may terminate. If such an abnormal situation is found, the on-board computer may determine an appropriate response at block 720. The appropriate response may include preventing the vehicle 108 from starting if the vehicle operator 106 is determined to be inebriated. If inebriation is detected while the vehicle 108 is in operation, the on-board computer 114 may determine to take control of the vehicle 108 in order to safely stop and shut down at an appropriate location—such as shift an operating mode of an autonomous or semi-autonomous vehicle into fully autonomous mode.

In some embodiments, the appropriate response may be determined based upon the determined level of inebriation, environmental conditions (e.g., weather, traffic, location, etc.), other determined occupant characteristics, and/or the presence or absence of other occupants within the vehicle 108. For example, if no other vehicle occupants or no other authorized operators of the vehicle are identified, the on-board computer 114 may prevent the vehicle 108 from starting and additionally initiate an electronic contact with an emergency contact stored in the user's profile. If the on-board computer 114 determines one or more additional authorized vehicle operators identifies as occupants of the vehicle 108, however, the on-board computer 114 may determine an appropriate response includes presenting an alert indicating that another authorized vehicle operator should operate the vehicle 108. In some embodiments, the on-board computer 114 may determine to contact appropriate family members or law enforcement agencies.

Additionally, or alternatively, the on-board computer 114 may provide an indication or alert to the occupants, such as by presenting an alert using the speaker 122 or 246, display 202, or feedback device 128, which may provide a haptic alert to the vehicle operator 106 or other occupant. Once one or more appropriate responses have been determined, the on-board computer 114 may implement the determined responses at block 722 using the speaker 122 or 246, display 202, feedback device 128, communication unit 220, or other components of the system 100. The method 700 may then terminate.

Exemplary Ergonomic Monitoring & Response

Figure 8:
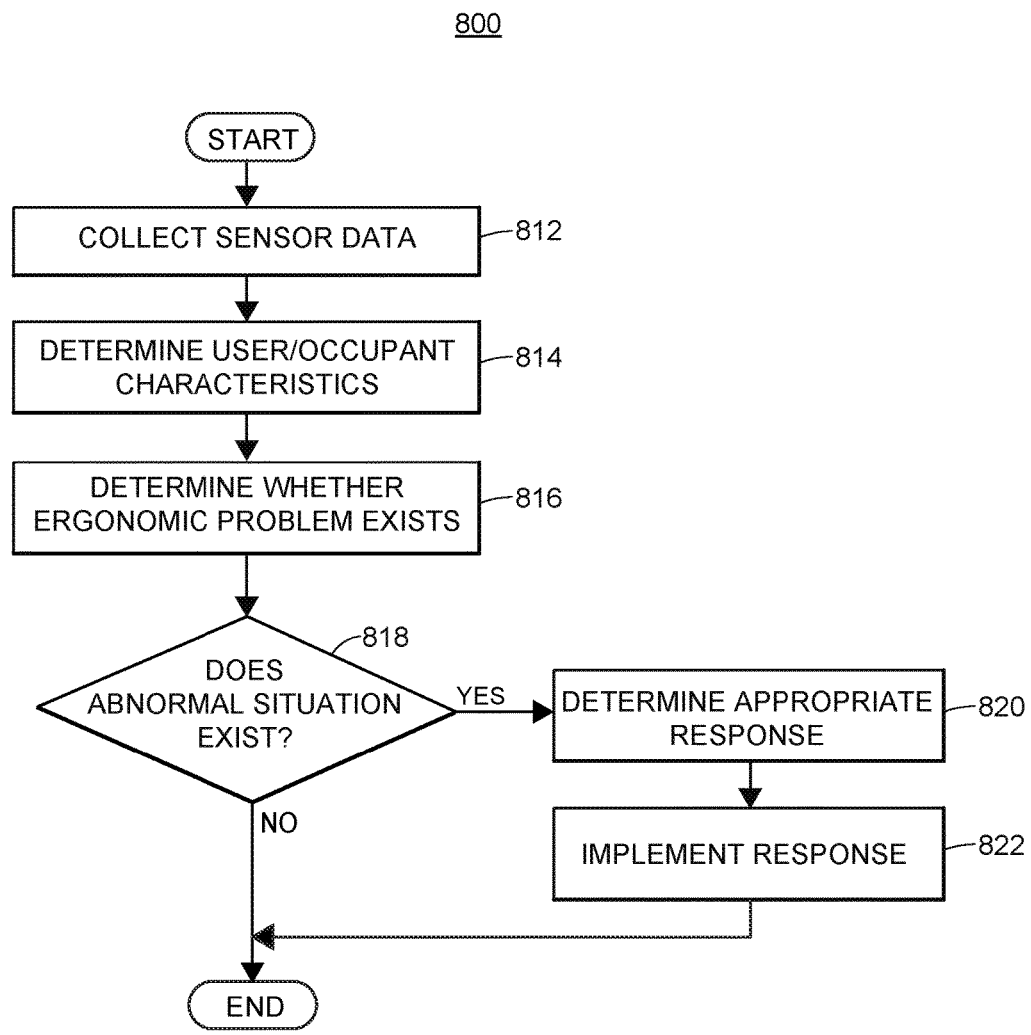
FIG. 8 illustrates a flow diagram of an exemplary ergonomic monitoring and response method that may be implemented by the vehicle occupant monitoring system.

FIG. 8 illustrates a flow diagram of an exemplary ergonomic monitoring and response method 800 that may be implemented by the vehicle occupant monitoring system 100. The method 800 may monitor vehicle occupants to determine when an ergonomic problem occurs and respond appropriately.

At block 812, the on-board computer 114 may collect sensor data from one or more sensors within the vehicle 108. Data from IR sensors 120 and/or cameras 124 may be particularly relevant for determining user characteristics associated with occupant ergonomics.

At block 814, the on-board computer 114 may determine one or more user or occupant characteristics associated ergonomics, particularly skeletal and/or muscular characteristics. User characteristics such as posture, facing direction, movement, muscle exertion, muscle tension, and/or muscle flushness may be particularly relevant, though other characteristics may likewise be determined.

At block 816, the on-board computer 114 may compare the determined characteristics against user profile data to determine whether an ergonomic problem exists. Because users may consistently repeat ergonomic problems, however, the on-board computer 114 may also analyze the user characteristics without reference to the user profile. For example, frequent shifting of weight or position adjustment movements by the user may indicate an ergonomic problem. Similarly, localized muscle tension or flushness may indicate that a problematic posture may be placing strain on those portions of the user's musculature.

At block 818, the on-board computer 114 may determine whether an abnormal condition associated with user ergonomics has been determined to exist. If no such abnormal situation is found, the method 800 may terminate. If such an abnormal situation is found, the on-board computer may determine an appropriate response at block 820. The determined response may include an alert or instructions to be presented to the vehicle operator 106 to improve the operator's posture. In some embodiments, the appropriate response may be determined based upon at least in part upon the user profile. For example, users may select whether to receive ergonomic recommendations or reminders. Some users may welcome such recommendations, while others may prefer not to receive such recommendations.

The on-board computer 114 may further take account of other user characteristics or the vehicle environment in determining an appropriate response. For example, recommendations regarding posture may be delayed or suppressed if the sensor data indicate that the vehicle operator 106 is agitated or anxious, or if the vehicle is operating in heavy traffic or adverse weather conditions.

Once one or more appropriate responses have been determined, the on-board computer 114 may implement the determined responses at block 822 using the speaker 122 or 246, display 202, feedback device 128, communication unit 220, or other components of the system 100. The method 800 may then terminate.

Exemplary Accident Monitoring & Response

Figure 9:
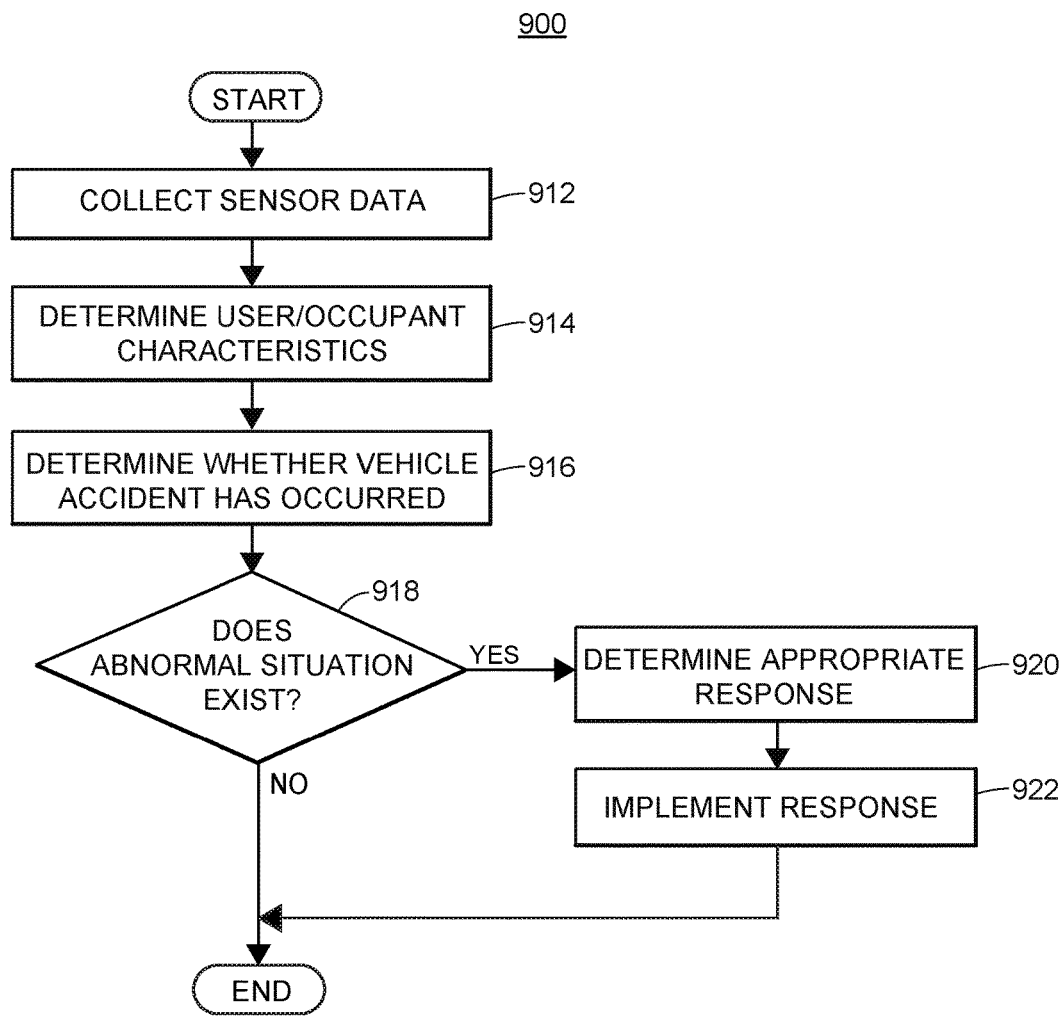
FIG. 9 illustrates a flow diagram of an exemplary accident monitoring and response method that may be implemented by the vehicle occupant monitoring system.

FIG. 9 illustrates a flow diagram of an exemplary accident monitoring and response method 900 that may be implemented by the vehicle occupant monitoring system 100. The method 900 may monitor vehicle occupants to determine when a vehicle accident has occurred based upon the effect on vehicle occupants and respond appropriately.

At block 912, the on-board computer 114 may collect sensor data from one or more sensors within the vehicle 108. Data from IR sensors 120, cameras 124, and/or microphones 126 may be particularly relevant for determining user characteristics associated with vehicle accidents, but other sensor data related to the vehicle 108 may also be collected. For example, accelerometer data, GPS data, or data from vehicle systems (e.g., airbag systems, ABS systems, engine monitoring systems, etc.) may be collected to determine vehicle accidents based upon the operation or operating state of the vehicle 108.

At block 914, the on-board computer 114 may determine one or more user or occupant characteristics associated with vehicle accidents. For example, user heart rate, movement, or skeletal characteristics may be particularly relevant to determination of the occurrence of a vehicle accident. For example, sudden and simultaneous movements of multiple vehicle occupants in the same direction may indicate a sudden shift in momentum of the entire vehicle 108, as typically occurs during a collision. Similarly, movement of vehicle occupant skeletal systems as a whole may be differentiated from movement of individual skeletal system segments (e.g., head, arms, hands, etc.). Movement of the entire skeletal system of an occupant may be determined as the introduction of an external force, such as occurs during impact with another vehicle or object. Changes in user characteristics such as heart rate or breathing rate may be particularly relevant following an accident, where sharp changes may be indicative of accident or injury.

At block 916, the on-board computer 114 may determine whether a vehicle accident has occurred based upon the user characteristics and/or vehicle sensor data. For example, the on-board computer 114 may determine the occurrence of an accident based upon an abnormal user heart rate combined with full-body movement and a sudden shift in accelerometer data. If no baseline user characteristics exist in a user profile for an occupant (such as an unknown occupant), a generic user profile may be used as a baseline. In such instances changes in occupant characteristics may be used to determine the occurrence of a vehicle accident.

At block 918, the on-board computer 114 may determine whether an abnormal condition associated with a vehicle accident has been determined to exist. If no such abnormal situation is found, the method 900 may terminate. If such an abnormal situation is found, the on-board computer may determine an appropriate response at block 920. The appropriate response may be determined based upon the received sensor data, determined occupant characteristics, the presence or absence of other occupants within the vehicle 108, and/or the nature and severity of the accident. For example, an appropriate response to a minor collision may include monitoring the vehicle occupant characteristics for indications of injuries and/or transmitting information regarding the collision to an insurer for claims processing. In contrast, an appropriate response to a severe accident may include generating and transmitting an automatic communication to an emergency response service.

In some embodiments, user characteristic data may be made accessible to emergency responders via the network 130. In further embodiments, the on-board computer 114 may determine that an appropriate response includes compiling sensor data and/or user characteristic data associated with a time period encompassing the vehicle accident, which compiled data may be stored in the memory 228 and/or transmitted to the server 140 for storage and/or analysis. In this way, a record of the vehicle accident (and the vehicle occupants) may be preserved for later use in insurance claims processing, vehicle operation assessment, criminal investigations, or legal disputes. In some embodiments, the on-board computer 114 may prevent the vehicle 108 from restarting or continuing to operate following an accident until the vehicle operator has been determined to be in a suitable physical and mental condition to operate the vehicle.

Once one or more appropriate responses have been determined, the on-board computer 114 may implement the determined responses at block 922 using the speaker 122 or 246, display 202, feedback device 128, communication unit 220, or other components of the system 100. The method 900 may then terminate.

Exemplary Unauthorized Occupant Monitoring & Response

Figure 10:
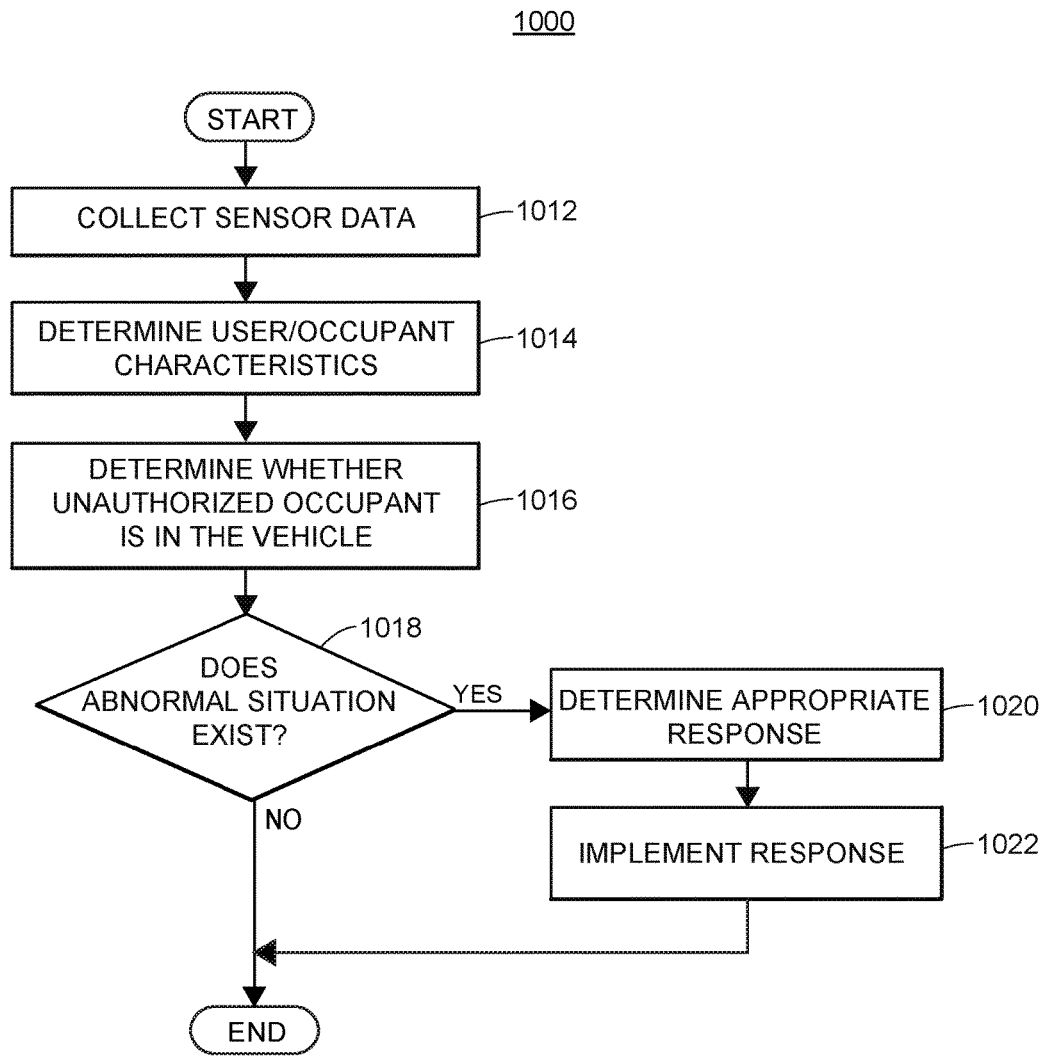
FIG. 10 illustrates a flow diagram of an exemplary unauthorized occupant monitoring and response method that may be implemented by the vehicle occupant monitoring system.

FIG. 10 illustrates a flow diagram of an exemplary unauthorized occupant monitoring and response method 1000 that may be implemented by the vehicle occupant monitoring system 100. The method 1000 may monitor vehicle occupants to determine when one or more unauthorized persons are in the vehicle and respond appropriately. Unauthorized persons may include identified occupants specifically prohibited from operating or traveling in the vehicle 108, as well as unidentified occupants. The presence of unauthorized vehicle occupants may be monitored to prevent theft (of the vehicle or items within the vehicle), to allow the vehicle owner control over vehicle usage (e.g., parents may prevent teenage drivers from driving multiple friends in a car), or to identify potential security threats (e.g., a carjacking).

At block 1012, the on-board computer 114 may collect sensor data from one or more sensors within the vehicle 108. Data from IR sensors 120 and/or cameras 124 may be particularly relevant for determining identifying user characteristics.

At block 1014, the on-board computer 114 may determine one or more user or occupant characteristics that may be used to identify users or occupants, such as facial features and heartbeat. In some embodiments, this may include determining behavioral characteristics of vehicle occupants that may indicate unauthorized occupants status or purpose for being in the vehicle, such as biometric indicators of nervousness or agitation (e.g., elevated heart rate, sweating, etc.) or quick movements (e.g., constantly scanning the environment by quick turns of the head).

At block 1016, the on-board computer 114 may determine the whether one or more vehicle occupants is an unauthorized occupant based upon the user characteristics. In some embodiments, this may include determining the identities of vehicle occupants. In further embodiments, this may include determining whether behavioral characteristics of an occupant indicate the occupant may be unauthorized, particularly in instances where identification of the occupant is unavailable or uncertain.

Further embodiments may include determining whether occupants are unauthorized based in part upon a user profile or a vehicle profile. For example, a vehicle profile may be stored in the data storage 228 that indicates a list of authorized vehicle operators, in which case an unauthorized occupant may be determined to be present if an occupant not on the list of authorized vehicle operators attempts to operate the vehicle 108. As another example, a user profile may indicate that only one unidentified occupant (or occupant not on a list of authorized passengers) may be a passenger in the vehicle at any given time.

At block 1018, the on-board computer 114 may determine whether an abnormal condition associated with an unauthorized vehicle occupant has been determined to exist. If no such abnormal situation is found, the method 1000 may terminate. If such an abnormal situation is found, the on-board computer may determine an appropriate response at block 1020. The appropriate response may be determined based upon the determined occupant characteristics, the presence or absence of authorized vehicle occupants, the authorization level of any authorized vehicle occupants present, user profiles, and/or a vehicle profile associated with the vehicle 108.

For example, an authorized vehicle operator may be prompted to authorize the unauthorized vehicle occupant (for a temporary or ongoing period) if the user profile allows such authorized vehicle operator to take such action. As another example, the on-board computer 114 may determine that the vehicle 108 should not start when no authorized operators are identified as being present.

The on-board computer 114 may further determined whether an alert should be presented, an alarm should sound, a vehicle owner should be notified, and/or police should be notified. In further embodiments, the on-board computer 114 may determine that an appropriate response includes compiling sensor data and/or user characteristic data associated with each unauthorized occupant, such as photographs of unauthorized occupants, which compiled data may be stored in the memory 228 and/or transmitted to the server 140 for storage and/or analysis. In this way, a record of the unauthorized occupants may be preserved for later use in later criminal investigations or for other purposes.

Once one or more appropriate responses have been determined, the on-board computer 114 may implement the determined responses at block 1022 using the speaker 122 or 246, display 202, feedback device 128, communication unit 220, control connections to the vehicle engine or engine cut-off, or other components of the system 100. The method 1000 may then terminate.

Exemplary Security Threat Monitoring & Response

Figure 11:
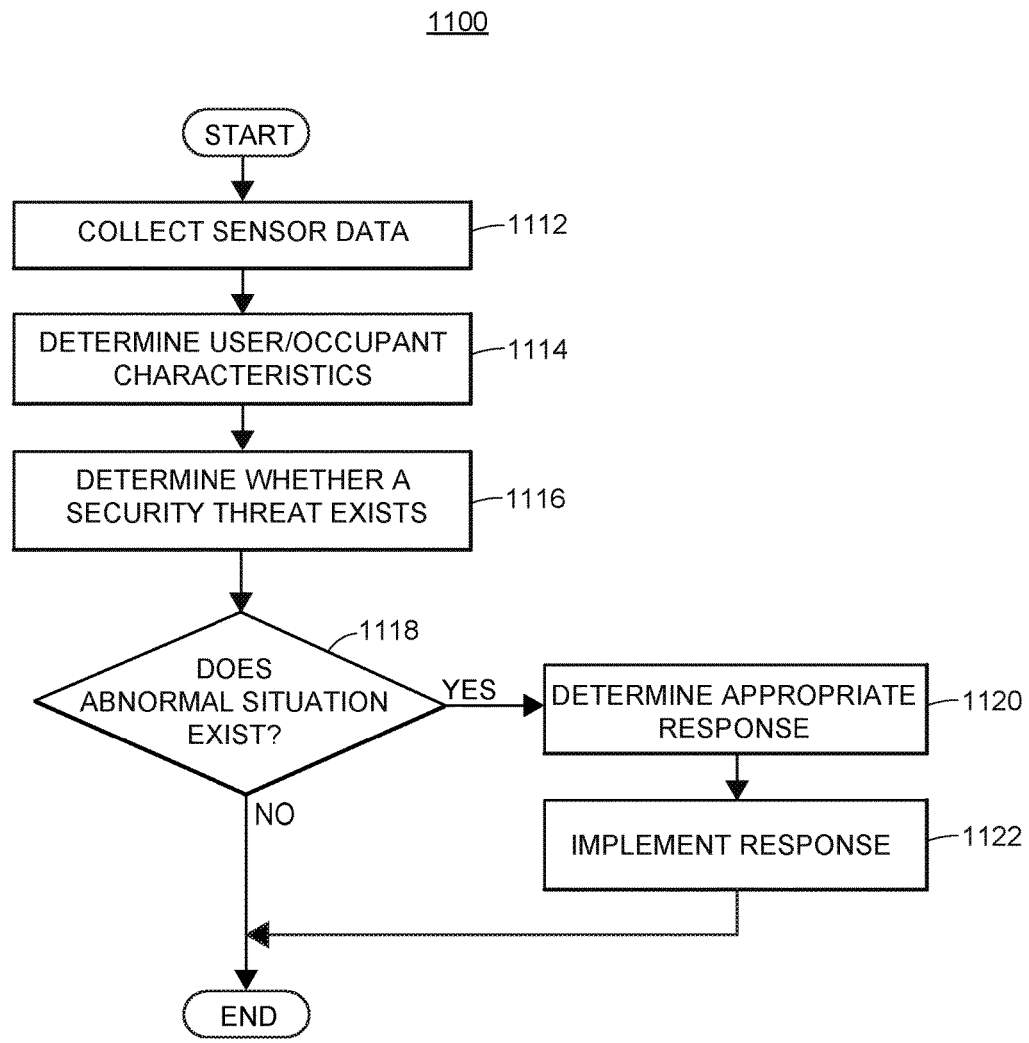
FIG. 11 illustrates a flow diagram of an exemplary security threat monitoring and response method that may be implemented by the vehicle occupant monitoring system.

FIG. 11 illustrates a flow diagram of an exemplary security threat monitoring and response method 1100 that may be implemented by the vehicle occupant monitoring system 100. The method 1100 may monitor vehicle occupants to determine when a security threat exists and respond appropriately. In a manner similar to that of method 1000, the method 1100 may distinguish between authorized occupants and unauthorized occupants within the vehicle 108. Additionally, the method 1100 may distinguish between levels of authorization in some embodiments. For example, an authorized occupant may nonetheless be determined to be a security threat if sensor data indicate the presence of a weapon on the authorized occupant's person.

At block 1112, the on-board computer 114 may collect sensor data from one or more sensors within the vehicle 108. Data from IR sensors 120 and/or cameras 124 may be particularly relevant for determining user characteristics associated with security threats. For example, IR sensor data may be used to identify concealed weapons based upon a temperature differential compared with the occupant's body.

At block 1114, the on-board computer 114 may determine one or more user or occupant characteristics that may be used to identify security threats. This may include occupant identity. In some embodiments, this may include determining behavioral characteristics of vehicle occupants, such as biometric indicators of nervousness or agitation (e.g., elevated heart rate, sweating, etc.) or quick movements (e.g., constantly scanning the environment by quick turns of the head).

At block 1116, the on-board computer 114 may determine whether a security threat exists (or is likely to exist) based upon the user characteristics. In some embodiments, this may include determining the identities of vehicle occupants. In further embodiments, this may include determining whether behavioral characteristics of an occupant indicate the occupant may be unstable, agitated, or aggressive. Further embodiments may include determining whether a weapon may be identified, and whether such weapon is concealed or exposed. If the weapon is exposed, the on-board computer 114 may further determine whether the weapon has been directed toward another vehicle occupant or otherwise brandished. For example, the on-board computer 114 may determine the presence of a concealed handgun based upon the difference in IR sensor data between the handgun and the occupant's body. In some embodiments, the on-board computer 114 may further determine whether such concealed weapon is on or about an authorized vehicle operator or occupant, and may further determine whether such vehicle operator or occupant is authorized to carry a weapon within the vehicle 108 based upon a user profile.

At block 1118, the on-board computer 114 may determine whether an abnormal condition associated with a security threat has been determined to exist. If no such abnormal situation is found, the method 1100 may terminate. If such an abnormal situation is found, the on-board computer may determine an appropriate response at block 1120. The appropriate response may be determined based upon the determined occupant characteristics, the presence or absence of authorized vehicle occupants, the authorization level of any authorized vehicle occupants present, user profiles, and/or a vehicle profile associated with the vehicle 108.

The on-board computer 114 may further determine whether an alert should be presented, an alarm should sound, a vehicle owner should be notified, and/or police should be notified. The on-board computer 114 may determine to alert vehicle occupants (openly or discretely, such as via the mobile device 110 or a haptic alert using the feedback device 128).

In some situations, the on-board computer 114 may determine an appropriate response includes notifying police or other law enforcement and/or emergency agencies or services. Such notifications may include automated electronic text or telephonic messages. For example, the on-board computer 114 may determine to notify police via a prerecorded or automated telephonic voice message when an unknown occupant is determined to have a weapon within the vehicle 108, which message may be communicated via the communication module 220 of the on-board computer 114 and/or the mobile device 110. Thus, the on-board computer 114 may cause the mobile device 110 to make an outgoing telephone call to an emergency response switchboard.

In further embodiments, the on-board computer 114 may determine that an appropriate response includes compiling sensor data and/or user characteristic data associated with each unauthorized occupant, such as photographs of occupants, which compiled data may be stored in the memory 228 and/or transmitted to the server 140 for storage and/or analysis. In this way, a record of the unauthorized occupants may be preserved for later use in later criminal investigations or for other purposes. In yet further embodiments, the on-board computer 114 may determine that an appropriate response includes stopping the vehicle 108.

Once one or more appropriate responses have been determined, the on-board computer 114 may implement the determined responses at block 1022 using the speaker 122 or 246, display 202, feedback device 128, communication unit 220, control connections to the vehicle engine or engine cut-off, or other components of the system 100. The method 1100 may then terminate.

Exemplary Operator Performance Monitoring & Response

Figure 12:
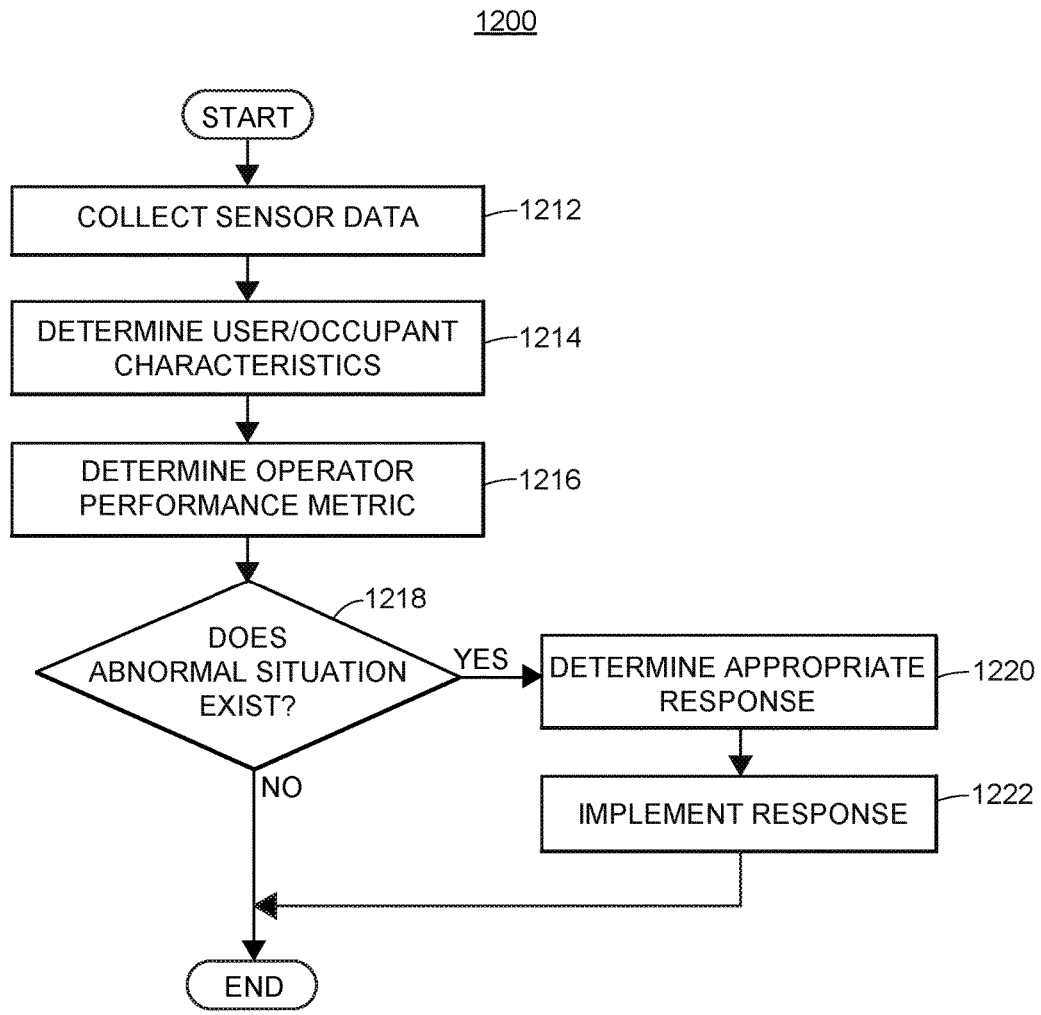
FIG. 12 illustrates a flow diagram of an exemplary operator performance monitoring and response method that may be implemented by the vehicle occupant monitoring system.

FIG. 12 illustrates a flow diagram of an exemplary operator performance monitoring and response method 1200 that may be implemented by the vehicle occupant monitoring system 100. The method 1200 may monitor a vehicle operator to determine the quality of vehicle operator performance in piloting the vehicle and respond appropriately.

At block 1212, the on-board computer 114 may collect sensor data from one or more sensors within the vehicle 108. Data from IR sensors 120, cameras 124, and/or microphones 126 may be particularly relevant for determining user characteristics, but other sensor data related to the vehicle 108 may also be collected. For example, accelerometer data, GPS data, or data from vehicle systems (e.g., proximity sensors, guidance or entertainment systems, active cruise control, etc.) may be collected to determine information regarding vehicle operation.

At block 1214, the on-board computer 114 may determine one or more user characteristics associated with the quality of vehicle operator performance. For example, user head orientation, gaze focus, blink rate, hand position, posture, or similar characteristics may be determined for use in further determining the level of attention or alertness of the vehicle operator. Other similar characteristics may be determined relating to vehicle operator physical or emotional state, such as illness, drowsiness, distraction, or agitation.

At block 1216, the on-board computer 114 may determine a metric of vehicle operator performance in operating the vehicle 108 based upon the user characteristics and/or vehicle sensor data. For example, the on-board computer 114 may determine whether the vehicle operator 106 is checking mirrors with sufficient frequency, whether the vehicle operator 106 is looking away from the road too long, whether the vehicle operator 106 is interacting with on-board guidance or entertainment systems too frequently, or whether the vehicle operator 106 is interacting with a mobile device 110 (such as a smartphone). In some embodiments, one or more user performance metrics may be calculated (e.g., on a scale from 0 to 100). In further embodiments, a total performance score may be determined for the vehicle operator 106 based upon the determined user characteristics and/or sensor data regarding the vehicle 108.

At block 1218, the on-board computer 114 may determine whether an abnormal condition associated with vehicle operator performance exists. An abnormal situation may be determined to exist if the vehicle operator performance metrics indicate high-risk vehicle operator or other conditions outside the ordinary operating performance range of the vehicle operator and/or a target range for safe vehicle operation. If no such abnormal situation is found, the method 1200 may terminate.

In some embodiments, the method 1200 may further generate a report regarding vehicle operator performance upon termination or periodically. Such report may include information relating to vehicle operator performance in one or more categories of vehicle operation (e.g., attention to operation, excessive braking, etc.). In some embodiments, the report may be presented to an instructor or other interested party as an indication of vehicle operator performance, such as during a driver education program.

If an abnormal situation is found, however, the on-board computer may determine an appropriate response at block 1220. The appropriate response may be determined based upon the received sensor data, determined occupant characteristics, one or more risk levels associated with the determined vehicle operator performance, and/or the user profile associated with the vehicle operator. In some embodiments, the appropriate response may include an alert or message to the vehicle operator 106, vehicle owner, vehicle insurer, or other interested party.

In further embodiments, the appropriate response may include generating a report regarding the vehicle operator performance, such as described above. Such reports may be transmitted to an insurer for use in determining or adjusting risk assessments, insurance rates, insurance premiums, discounts, costs, terms, or other aspects of insurance policies associated with vehicle operators 106 and/or vehicles 108. In instances of extreme vehicle operator performance problems, the on-board computer 114 may determine an appropriate response includes taking control of the vehicle 108 or shutting down the vehicle 108.

Once one or more appropriate responses have been determined, the on-board computer 114 may implement the determined responses at block 1222 using the speaker 122 or 246, display 202, feedback device 128, communication unit 220, or other components of the system 100. The method 1200 may then terminate.

Exemplary Risk Detection

Figure 13:
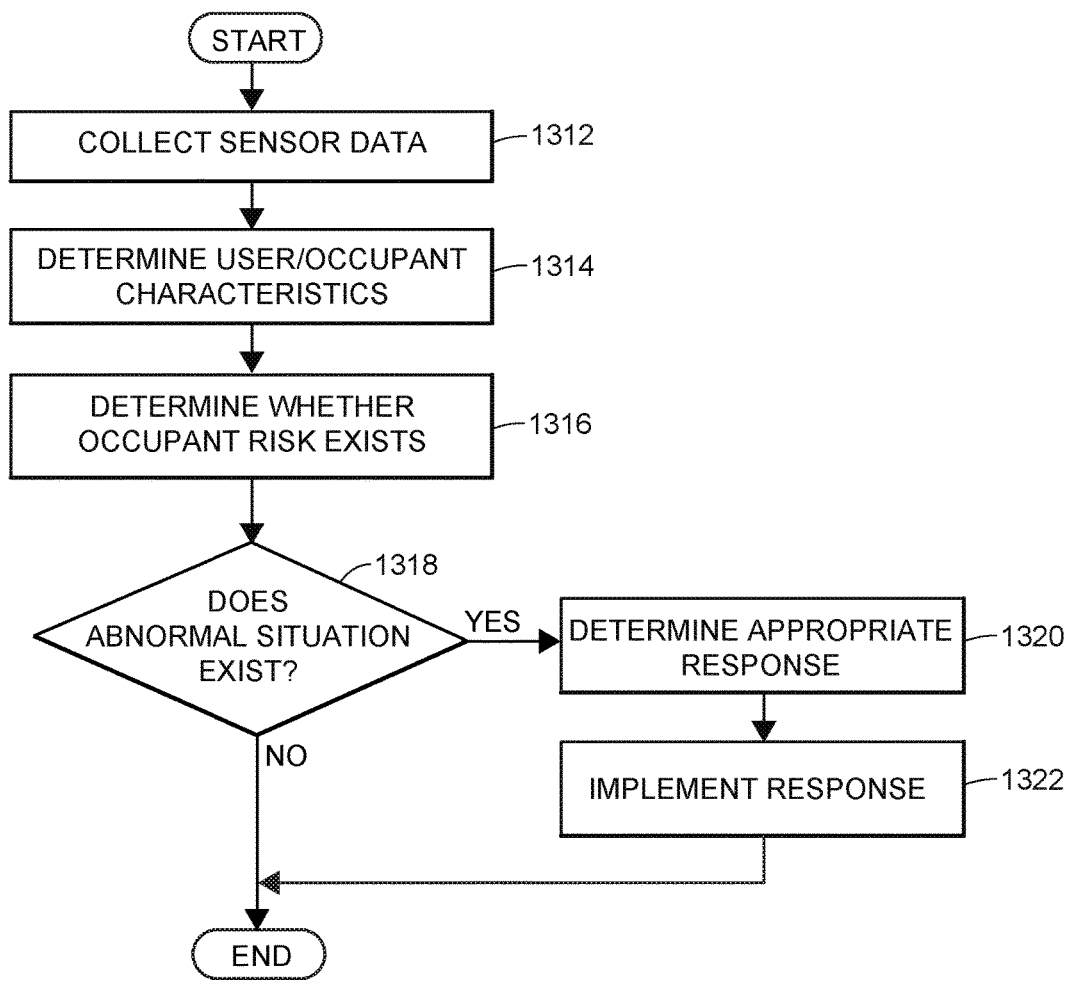
FIG. 13 illustrates a flow diagram of an exemplary vehicle occupant risk determination method that may be implemented by the vehicle occupant monitoring system.

FIG. 13 illustrates a flow diagram of an exemplary occupant risk detection method 1300 that may be implemented by the vehicle occupant monitoring system 100. The method 1300 may monitor the vehicle 108 when no vehicle operator 106 is present to determine risks to vehicle occupants and respond appropriately. Such vehicle occupants may include children or pets left unattended in a vehicle 108.

At block 1312, the on-board computer 114 may collect sensor data from one or more sensors within the vehicle 108. Data from IR sensors 120 and/or cameras 124 may be particularly relevant for determining user characteristics identifying and/or determining risks to vehicle occupants.

At block 1314, the on-board computer 114 may determine one or more vehicle occupant characteristics associated with medical health or medical emergencies. In some embodiments, this may include determining whether one or more occupants are within the vehicle 108. Occupant characteristics such as heart rate, pulse strength, heartbeat pattern, breathing rate, breathing volume, breathing pattern, facial features, vocal pattern, and/or skin temperature may be particularly relevant, though other characteristics may likewise be determined.

At block 1316, the on-board computer 114 may determine whether a risk to one or more occupants exists. For example, an increase in heart rate and skin temperature data may indicate that a child or pet is becoming overheated, particularly if combined with sensor data indicating an increase in temperature within the vehicle 108. As another example, a vehicle occupant risk may be determined to exist if the vehicle occupant has been left unattended for a period of time extending beyond an appropriate time threshold, which time threshold may vary based upon a determined identity or category (e.g., pet, child, adult) of the occupant. If no baseline user characteristics exist in a user profile for an occupant, a generic user profile may be used as a baseline. In such instances changes in occupant characteristics may be used to determine the existence of a vehicle occupant risk.

At block 1318, the on-board computer 114 may determine whether an abnormal condition associated with a vehicle occupant risk has been determined to exist. If no such abnormal situation is found, the method 1300 may terminate. If such an abnormal situation is found, the on-board computer may determine an appropriate response at block 1320.

The appropriate response may be determined based upon the received sensor data, determined occupant identity or category, determined occupant characteristics, the presence or absence of other occupants within the vehicle 108, and/or the nature and severity of the vehicle operator risk. For example, an appropriate response to determining a vehicle occupant is overheating may include opening windows of the vehicle (fully or partially) or turning on an air conditioning feature of the vehicle. In some embodiments, the on-board computer 114 may determine that an appropriate response includes presenting an alert to a vehicle operator 106 or owner, which may be presented using the mobile device 110 or other means. In further embodiments, the on-board computer 114 may cause an electronic text and/or telephonic message to be transmitted to an emergency service or agency regarding the vehicle occupant risk via the network 130 using the communication module 220.

Once one or more appropriate responses have been determined, the on-board computer 114 may implement the determined responses at block 1322 using the speaker 122 or 246, display 202, feedback device 128, communication unit 220, or other components of the system 100. The method 1300 may then terminate.

Exemplary Mobile Device Blocking

Figure 14:
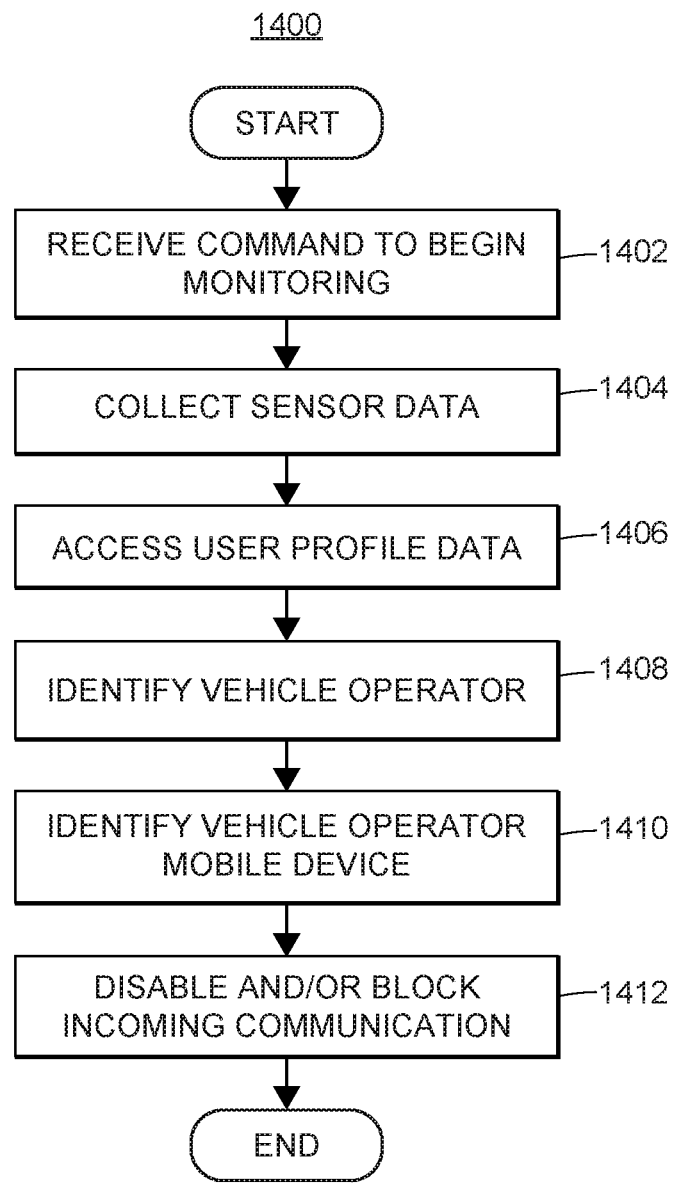
FIG. 14 illustrates a flow diagram of an exemplary mobile device disablement method that may be implemented by the vehicle occupant monitoring system.

FIG. 14 illustrates a flow diagram of an exemplary mobile device disablement method 1400 that may be implemented by the vehicle occupant monitoring system 100. The method 1400 may operate in conjunction with or in a manner similar to the methods 300-1300 described above. At block 1402, the method may begin with receiving a command to begin monitoring the occupants of the vehicle 108. Sensor data may be collected at block 1404 and compared with profiles accessed at block 1406 to identify the vehicle operator 106 at block 1408. Once the vehicle operator 106 is identified, one or more mobile devices 110 associated with the vehicle operator 106 may be identified at block 1410. The on-board computer 114 may then disable and/or block incoming communication into the identified mobile device 110 to reduce distractions and promote safe operation of the vehicle 108 at block 1412. Although the method 1400 is described below as being implemented using the on-board computer 114, some or all of the steps may likewise be implemented using the mobile device 110, the server 140, or a combination of some or all of these.

At block 1402, the on-board computer 114 may receive a command to monitoring occupants within the vehicle 108. The command may be entered by the user, in some embodiments, or the command may be automatically generated by the on-board computer 114. For example, the on-board computer 114 may automatically implement the method 1400 upon determining the presence of an occupant in the vehicle 108 or when the vehicle is started. The method 1400 may continue to be implemented while the vehicle remains in operation.

At block 1404, the on-board computer 114 may collect sensor data from the sensors within the vehicle. In particular, sensor data may be collected from one or more IR sensors 120, cameras 124, and/or microphones 126. The sensor data may be collected for a short period of time, which may be taken as a snapshot of the vehicle occupants. Based upon the sensor data, the on-board computer 114 may determine a number of occupants of the vehicle, including one or more vehicle occupants positioned within the vehicle 108 to operate the vehicle 108. In some embodiments, the on-board computer 114 may process part or all of the received sensor data to determine occupant characteristics for comparison against occupant characteristics stored in user profiles, as discussed above. In further embodiments, occupant characteristics may be determined only for the one or more vehicle operators 106.

At block 1406, the on-board computer 114 may access one or more user profiles stored in the data storage 228 or the database 146. The user profiles may be selected from a set of user profiles associated with the vehicle 108. Additionally, or alternatively, the user profiles may be searched based upon the sensor data collected at block 1404 to find matches for the vehicle operator 106.

At block 1408, the on-board computer 114 may identify one or more vehicle operators 106 based upon the user profiles. This may include regressing the sensor data or derived occupant characteristics against data stored in a plurality of user profiles to determine a probability of a match between the vehicle operator 106 and one or more user profiles. If no match can be found in the accessed user profiles, the on-board computer 114 may attempt to find a match with additional user profiles stored in the system memory 228 or the database 146. Additionally, or alternatively, the on-board computer 114 may collect further sensor data and attempt to determine the identities of the one or more vehicle operators 106 using the new sensor data. If the identity of one or more of the vehicle occupants cannot be determined with sufficient certainty, then the on-board computer 114 may identify such occupants as unknown users. In such instances where the vehicle operator 106 is an unknown user, the on-board computer 114 may request or automatically obtain additional data regarding the vehicle operator 106 and generate a user profile for the user. Alternatively, the method 1400 may terminate if the vehicle operator 106 cannot be identified.

At block 1410, the on-board computer 114 may identify one or more mobile devices 110 associated with the one or more vehicle operators 106 based upon the user profiles. For example, the user profile of the vehicle operator 106 may indicate a smartphone and a wearable computing device associated with the vehicle operator 106. In some embodiments, this may include identifying one or more mobile devices 110 communicatively connected to the on-board computer 114, such as by a Bluetooth communication link. As there may be multiple mobile devices 110 associated with vehicle occupants within the vehicle, the on-board computer 114 may distinguish between mobile devices 110 associated with the vehicle operator 106 (use of which should be limited during vehicle operation) and mobile devices 110 associated with vehicle passengers (use of which may be left unrestricted).

At block 1412, the on-board computer 114 may disable or block incoming communications from reaching the one or more identified mobile devices 110 associated with the vehicle operator 106. This may include sending a signal to the mobile device 110 to temporarily disable communication or other features of the mobile device 110 while the vehicle is operating. In some embodiments, this may include preventing income and outgoing communication from the identified mobile devices 110. In alternative embodiments, some types of communications may be permitted, while other types communications may be entirely disabled. For example, SMS text messaging and e-mail may be disabled, while telephonic communications may be allowed (or may be allowed only if operated through an interface of the on-board computer 114, rather than through the display 202 of the mobile device 110). Where the mobile device 110 is paired with the on-board computer 114 (e.g., via Bluetooth or other wireless communication connection), the on-board computer 114 may block communication by presenting an automatic message to the mobile device 110 in response to attempts to communicate using the on-board computer 114. For example, an automatic text or prerecorded message may be sent to the mobile device 110 in response to an incoming communication.

Once the on-board computer 114 determines that the vehicle operator 106 is no longer operating the vehicle 108, the on-board computer 114 may cause the mobile device 110 to resume normal or full functioning, and the method 1400 may terminate. In some embodiments, the mobile device 110 may continue attempting to operate normally during vehicle operation, so the mobile device 110 may automatically resume normal operation when the disabling or blocking functionality of the on-board computer 114 is removed upon termination of the method 1400.

Other Matters

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Further, unless a claim element is defined by expressly reciting the words "means for" or "step for" and a function without the recital of any structure, it is not intended that the scope of any claim element be interpreted based on the application of 35 U.S.C. § 112(f).

As used herein, the term "vehicle" may refer to any of a number of motorized transportation devices. A vehicle may be a car, truck, bus, train, boat, plane, etc. Additionally, as used herein, the term "impairment" refers to any of a number of conditions that may reduce vehicle operator performance. A vehicle operator may be impaired if the vehicle operator is drowsy, asleep, distracted, intoxicated, ill, injured, suffering from a sudden onset of a medical condition, or in an impaired emotional state such as anxiety, agitation, aggression, nervousness, hyperactivity, or mania.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

What is claimed is:

1. A computer-implemented method for monitoring one or more vehicle occupants of a vehicle, comprising:
   receiving, from one or more sensors disposed within the vehicle, sensor data regarding the one or more vehicle occupants;
   determining one or more vehicle occupant characteristics for at least one of the one or more vehicle occupants based upon the received sensor data, wherein the at least one of the one or more vehicle occupants is distinct from a vehicle operator, wherein the one or more vehicle occupant characteristics include one or more skeletal characteristics of the at least one of the one or more vehicle occupants;

determining whether an abnormal situation exists based upon the one or more determined vehicle occupant characteristics associated with the at least one of the one or more vehicle occupants, wherein the abnormal situation relates to one or more of the following types of abnormal situations: a medical emergency, a health risk, an accident risk, an impairment of a vehicle occupant, or a security threat;

determining one or more responses to the abnormal situation based upon the one or more determined vehicle occupant characteristics when an abnormal situation is determined to exist, wherein the one or more responses are based upon the determined type of the abnormal situation; and causing the one or more responses to the abnormal situation to be implemented.

2. The computer-implemented method of claim 1, wherein the one or more skeletal characteristics indicate the position of a plurality of segments of the vehicle occupant's body, wherein the plurality of segments include the vehicle occupant's head and at least a portion of a limb of the vehicle occupant.

3. The computer-implemented method of claim 1, further comprising:

identifying the at least one of the one or more vehicle occupants based upon the one or more determined vehicle occupant characteristics, wherein identifying the at least one of the one or more vehicle occupants includes comparing the one or more determined vehicle occupant characteristics with data regarding characteristics stored in a user profile.

4. The computer-implemented method of claim 3, wherein determining whether the abnormal situation exists includes determining whether the one or more determined vehicle occupant characteristics are beyond a baseline range for the vehicle occupant based upon the data regarding the characteristics stored in the user profile of the vehicle occupant.

5. The computer-implemented method of claim 1, wherein the one or more responses include one or more of the following: controlling vehicle operation by an on-board computer system, adjusting an environmental condition within the vehicle, communicating a message to an emergency response service, or terminating vehicle operation.

6. The computer-implemented method of claim 1, wherein the one or more responses include communicating sensor data to one or more computing devices associated with emergency response personnel.

7. The computer-implemented method of claim 1, wherein the one or more sensors include one or more infrared sensors disposed within the vehicle.

8. A computer system for monitoring one or more vehicle occupants of a vehicle, comprising:

one or more processors;

one or more sensors disposed within the vehicle and communicatively connected to the one or more processors; and a program memory coupled to the one or more processors and storing executable instructions that when executed by the one or more processors cause the computer system to:

receive sensor data regarding the one or more vehicle occupants from the one or more sensors;

determine one or more vehicle occupant characteristics for at least one of the one or more vehicle occupants based upon the received sensor data, wherein the at least one of the one or more vehicle occupants is distinct from a vehicle operator, wherein the one or more vehicle occupant characteristics include one or more skeletal characteristics of the at least one of the one or more vehicle occupants;

determine whether an abnormal situation exists based upon the one or more determined vehicle occupant characteristics associated with the at least one of the one or more vehicle occupants, wherein the abnormal situation relates to one or more of the following types of abnormal situations: a medical emergency, a health risk, an accident risk, an impairment of a vehicle occupant, or a security threat;

determine one or more responses to the abnormal situation based upon the one or more determined vehicle occupant characteristics when an abnormal situation is determined to exist, wherein the one or more responses are based upon the determined type of the abnormal situation; and cause the one or more responses to the abnormal situation to be implemented.

9. The computer system of claim 8, wherein the one or more skeletal characteristics indicates the position of a plurality of segments of the vehicle occupant's body, wherein the plurality of segments include the vehicle occupant's head and at least a portion of a limb of the vehicle occupant.

10. The computer system of claim 8, wherein the program memory further stores executable instructions that cause the computer system to:

identify the at least one of the one or more vehicle occupants based upon the one or more determined vehicle occupant characteristics, wherein identifying the at least one of the one or more vehicle occupants includes comparing the one or more determined vehicle occupant characteristics with data regarding characteristics stored in a user profile.

11. The computer system of claim 10, wherein the executable instructions that cause the computer system to determine whether the abnormal situation exists further cause the computer system to determine whether the one or more determined vehicle occupant characteristics are beyond a baseline range for the vehicle occupant based upon the data regarding the characteristics stored in the user profile of the vehicle occupant.

12. The computer system of claim 8, wherein the one or more responses include one or more of the following: controlling vehicle operation by an on-board computer system, adjusting an environmental condition within the vehicle, communicating a message to an emergency response service, or terminating vehicle operation.

13. The computer system of claim 8, wherein the one or more sensors include one or more infrared sensors disposed within the vehicle.

14. A tangible, non-transitory computer-readable medium storing instructions for monitoring one or more vehicle occupants of a vehicle that, when executed by at least one processor of a computer system, cause the computer system to:

receive sensor data regarding the one or more vehicle occupants from one or more sensors disposed within the vehicle;

determine one or more vehicle occupant characteristics for at least one of the one or more vehicle occupants based upon the received sensor data, wherein the at least one of the one or more vehicle occupants is distinct from a vehicle operator, wherein the one or more vehicle occupant characteristics include one or more skeletal characteristics of the at least one of the one or more vehicle occupants;

determine whether an abnormal situation exists based upon the one or more determined vehicle occupant characteristics associated with the at least one of the one or more vehicle occupants, wherein the abnormal situation relates to one or more of the following types of abnormal situations: a medical emergency, a health risk, an accident risk, an impairment of a vehicle occupant, or a security threat;

determine one or more responses to the abnormal situation based upon the one or more determined vehicle occupant characteristics when an abnormal situation is determined to exist, wherein the one or more responses are based upon the determined type of the abnormal situation; and cause the one or more responses to the abnormal situation to be implemented.

15. The tangible, non-transitory computer-readable medium of claim 14, wherein the one or more skeletal characteristics of the at least one of the one or more vehicle occupants indicate the position of a plurality of segments of the vehicle occupant's body, wherein the plurality of segments include the vehicle occupant's head and at least a portion of a limb of the vehicle occupant.

16. The tangible, non-transitory computer-readable medium of claim 14, further storing instructions that cause the computer system to:

identify the at least one of the one or more vehicle occupants based upon the one or more determined vehicle occupant characteristics, wherein identifying the at least one of the one or more vehicle occupants includes comparing the one or more determined vehicle occupant characteristics with data regarding characteristics stored in a user profile.

17. The tangible, non-transitory computer-readable medium of claim 16, wherein the instructions that cause the computer system to determine whether the abnormal situation exists further cause the computer system to determine whether the one or more determined vehicle occupant characteristics for a vehicle operator are beyond a baseline range for the vehicle occupant based upon the data regarding the characteristics stored in the user profile of the vehicle operator.

18. The tangible, non-transitory computer-readable medium of claim 14, wherein the one or more responses include one or more of the following: controlling vehicle operation by an on-board computer system, adjusting an environmental condition within the vehicle, communicating a message to an emergency response service, or terminating vehicle operation.

* * * * *

UNITED STATES PATENT AND TRADEMARK OFFICE
CERTIFICATE OF CORRECTION

PATENT NO. : 9,988,055 B1
APPLICATION NO. : 15/248073
DATED : June 5, 2018
INVENTOR(S) : Seth O'Flaherty et al.

Page 1 of 1

It is certified that error appears in the above-identified patent and that said Letters Patent is hereby corrected as shown below:

On the Title Page

In Column 1, under "Notice", Line 3, "0 days. days." should be -- 0 days. --.

Signed and Sealed this
Thirteenth Day of November, 2018

Andrei Iancu
*Director of the United States Patent and Trademark Office*